US008138238B2

(12) United States Patent
Hoogmartens et al.

(10) Patent No.: US 8,138,238 B2
(45) Date of Patent: *Mar. 20, 2012

(54) NON-AQUEOUS PIGMENTED INKJET INKS

(75) Inventors: Ivan Hoogmartens, Wilrijk (BE); Katrien Bernaerts, Overpelt (BE); Geert Deroover, Lier (BE)

(73) Assignee: Agfa Graphics NV, Mortsel (BE)

( * ) Notice: Subject to any disclaimer, the term of this patent is extended or adjusted under 35 U.S.C. 154(b) by 307 days.

This patent is subject to a terminal disclaimer.

(21) Appl. No.: 12/441,719

(22) PCT Filed: Oct. 2, 2007

(86) PCT No.: PCT/EP2007/060487
§ 371 (c)(1),
(2), (4) Date: Mar. 18, 2009

(87) PCT Pub. No.: WO2008/043696
PCT Pub. Date: Apr. 17, 2008

(65) Prior Publication Data
US 2009/0270537 A1     Oct. 29, 2009

Related U.S. Application Data

(60) Provisional application No. 60/829,572, filed on Oct. 16, 2006.

(30) Foreign Application Priority Data

Oct. 11, 2006 (EP) .................................. 06122091

(51) Int. Cl.
| C07D 243/08 | (2006.01) |
| C08G 63/60 | (2006.01) |
| C08G 67/02 | (2006.01) |
| C08G 69/26 | (2006.01) |
| C08J 3/00 | (2006.01) |
| C08K 5/34 | (2006.01) |
| C08K 5/48 | (2006.01) |
| C08L 67/00 | (2006.01) |
| C08L 73/00 | (2006.01) |
| C08L 77/00 | (2006.01) |
| C08L 79/00 | (2006.01) |
| C09D 5/00 | (2006.01) |
| C09D 11/00 | (2006.01) |

(52) U.S. Cl. .......... 523/160; 522/163; 523/161; 524/92; 524/599; 524/606; 524/612

(58) Field of Classification Search ................. 523/160, 523/161; 524/92, 599, 606, 612; 522/163
See application file for complete search history.

(56) References Cited

U.S. PATENT DOCUMENTS

| 5,395,734 A | 3/1995 | Vogel et al. |
| 6,197,877 B1 | 3/2001 | Thetford et al. |
| 2003/0181544 A1 | 9/2003 | Thetford et al. |
| 2005/0155521 A1 | 7/2005 | Herrmann et al. |

FOREIGN PATENT DOCUMENTS

| EP | 0 158 406 A1 | 10/1985 |
| EP | 0 164 817 A2 | 12/1985 |
| EP | 1 555 280 A2 | 7/2005 |
| WO | 00/46313 A1 | 8/2000 |
| WO | 01/80987 A2 | 11/2001 |
| WO | 2004/067287 A1 | 8/2004 |

OTHER PUBLICATIONS

Official Communication issued in International Patent Application No. PCT/EP2007/060487, mailed on Nov. 23, 2007.
Deroover et al.; "Non-Aqueous Pigmented Inkjet Inks"; U.S. Appl. No. 12/441,725, filed Mar. 18, 2009.
Bernaerts et al.; "Non-Aqueous Pigmented Inkjet Inks"; U.S. Appl. No. 12/441,718, filed Mar. 18, 2009.

*Primary Examiner* — Patrick Niland
(74) *Attorney, Agent, or Firm* — Keating & Bennett, LLP

(57) ABSTRACT

A non-aqueous inkjet ink includes C.I. Pigment Yellow 150 and a polymeric dispersant according to Formula (I):

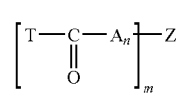

Formula (I)

wherein,

T represents hydrogen or a polymerization terminating group;

Z represents the residue of polyethyleneimine having a number-average molecular weight of at least 100;

A represents an oxyalkylene carbonyl group;

T-C(O)$A_n$- represents a TPOAC-chain which is bound to Z through an amide bond; and n and m are integers wherein m is at least 2 and n is from 2 to 100;

the polymeric dispersant fulfills the conditions of:

$W_{TPOAC} > 57$ and $N_{Amide} \geq 65$ mol % wherein $W_{TPOAC}$ represents the ratio of the weight percentage of TPOAC-chains over the weight percentage of amide bonds in the polymeric dispersant;

$N_{Amide}$ represents the mol % of amide bonds based on the total nitrogen content of the polymeric dispersant; and the values of $W_{TPOAC}$ and $N_{Amide}$ are calculated from the total nitrogen content determined by dry combustion of the polymeric dispersant and from the amine content determined through potentiometric titration in a mixture of $CH_3COOH$:THF (14.5:0.5) with 0.1N aqueous perchloric acid.

10 Claims, No Drawings

NON-AQUEOUS PIGMENTED INKJET INKS

CROSS-REFERENCE TO RELATED APPLICATIONS

This application is a 371 National Stage Application of PCT/EP2007/060487, filed Oct. 2, 2007. This application claims the benefit of U.S. Provisional Application No. 60/829,572, filed Oct. 16, 2006, which is incorporated by reference herein in its entirety. In addition, this application claims the benefit of European Application No. 06122091.9, filed Oct. 11, 2006, which is also incorporated by reference herein in its entirety.

BACKGROUND OF THE INVENTION

1. Field of the Invention

The present invention relates to stable inkjet inks comprising a yellow pigment in a non-aqueous medium.

2. Description of the Related Art

Pigment dispersions are made using a dispersant. A dispersant is a substance for promoting the formation and stabilization of a dispersion of pigment particles in a dispersion medium. Dispersants are generally surface-active materials having an anionic, cationic or non-ionic structure. The presence of a dispersant substantially reduces the dispersing energy required. Dispersed pigment particles may have a tendency to re-agglomerate after the dispersing operation, due to mutual attraction forces. The use of dispersants also counteracts this re-agglomeration tendency of the pigment particles.

The dispersant has to meet particularly high requirements when used for inkjet inks. Inadequate dispersing manifests itself as increased viscosity in liquid systems, loss of brilliance and/or hue shifts. Moreover, particularly good dispersion of the pigment particles is required to ensure unimpeded passage of the pigment particles through the nozzles of the print head in an inkjet printer, which are usually only a few micrometers in diameter. In addition, pigment particle agglomeration and the associated blockage of the printer nozzles has to be avoided in the standby periods of the printer.

Many polymeric dispersants contain in one part of the molecule so-called anchor groups, which adsorb onto the pigments to be dispersed. In a spatially separate part of the molecule, polymeric dispersants have polymer chains sticking out whereby pigment particles are made compatible with the dispersion medium, i.e. stabilized.

The properties of polymeric dispersants depend on both the nature of the monomers and their distribution in the polymer. Polymeric dispersants obtained by statistically polymerizing monomers (e.g. monomers A and B polymerized into ABBAABAB) or by polymerizing alternating monomers (e.g. monomers A and B polymerized into ABABABAB) generally result in poor dispersion stability. Improvements in dispersion stability were obtained using graft copolymer and block copolymer dispersants.

In the design of polymeric dispersants for pigment dispersions, dispersants which contain a polyester chain moiety derived from one or more hydroxycarboxylic acids or lactones thereof have been known for a long time. Early examples of such dispersants are disclosed in EP 0158406 A (ICI) for dispersing finely divided particles of a magnetic material in an organic liquid.

These are generally of two distinct chemical types. In the first type, the hydroxycarboxylic acid or lactone is polymerized in the presence of an alkylcarboxylic acid as polymerization terminating group to give a polyester chain having a free carboxylic acid which is then reacted with an amine such as polyethyleneimine.

In the second type of dispersant, the hydroxycarboxylic acid or lactone is polymerized in the presence of an aliphatic alcohol as polymerization terminating group to give a polyester chain having a free hydroxyl group which is subsequently converted to a phosphate ester. Early examples of such dispersants are disclosed in EP 0164817 A (ICI).

More recently, the properties of such dispersants have been improved by branching the alkylene group of the polyester chain as disclosed in U.S. Pat. No. 6,197,877 (ZENECA) or by using polymerization terminating groups containing a branched aliphatic chain as disclosed in US 2003181544 (AVECIA).

Generally pigments have a non-polar surface. In aqueous inkjet inks, the polymeric dispersants generally contain hydrophobic anchor groups exhibiting a high affinity for the pigment surface and hydrophilic polymer chains for stabilizing the pigments in the aqueous dispersion medium. The preparation of thermally stable dispersions with submicron particles is often more difficult in the case of non-aqueous inkjet inks where both the pigment surface and the dispersion medium are non-polar. Especially quinacridone pigments and yellow pigments, such as C.I. Pigment Yellow 120, C.I. Pigment Yellow 213 and C.I. Pigment Yellow 150, pose difficulties.

For consistent image quality, the inkjet ink should be capable of dealing with elevated temperatures during transport of the ink to a customer and also during inkjet printing where the inkjet ink is generally heated to a temperature above 40° C.

Non-aqueous inkjet inks, especially radiation curable inkjet inks, are printed on a wide variety of substrates requiring different compositions of the liquid carrier to have adequate adhesion properties onto the different substrates. Usually a concentrated pigment dispersion is made which is then diluted with a specific liquid carrier for a certain inkjet application. It has been observed that while in a number of cases the dilution of the concentrated pigment dispersion results in stable inkjet inks, in a number of other cases the dilution results in inkjet inks of poor dispersion quality and stability.

Preparing different concentrated pigment dispersions is not only a time consuming and costly activity in the development of inkjet inks but also restricts the flexibility in ink manufacturing requiring the availability of stocks of different pigment dispersions to guarantee deliverability of ink.

SUMMARY OF THE INVENTION

In order to overcome the problems described above, preferred embodiments of the present invention provide non-aqueous inkjet inks which can be prepared from the same concentrated pigment dispersion without loss of dispersion quality or stability.

Another preferred embodiment of the present invention provides non-aqueous inkjet inks and ink sets improved for dispersion quality and stability.

Further advantages and benefits of the preferred embodiments of the present invention will become apparent from the description hereinafter.

The pigment C.I. Pigment Yellow 150 could be dispersed into a concentrated pigment dispersion and then diluted with a wide range of organic solvents exhibiting no significant loss in dispersion quality and stability using a specific polymeric dispersant.

Advantages and benefits of a preferred embodiment of the present invention are realized with a non-aqueous inkjet ink comprising C.I. Pigment Yellow 150 and a polymeric dispersant according to Formula (I):

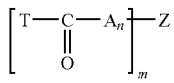

Formula (I)

wherein,
T represents hydrogen or a polymerization terminating group;
Z represents the residue of polyethyleneimine having a number-average molecular weight of at least 100;
A represents an oxyalkylene carbonyl group;
T-C(O)$A_n$- represents a TPOAC-chain which is bound to Z through an amide bond; and
n and m are integers wherein m is at least 2 and n is from 2 to 100;
characterized in that the polymeric dispersant fulfills the conditions of:

$$W_{TPOAC} > 57 \text{ and } N_{Amide} \geq 65 \text{ mol \%}$$

with
$W_{TPOAC}$ representing the ratio of the weight percentage of TPOAC-chains over the weight percentage of amide bonds in the polymeric dispersant;
$N_{Amide}$ representing the mol % of amide bonds based on the total nitrogen content of the polymeric dispersant; and
wherein the values of $W_{TPOAC}$ and $N_{Amide}$ are calculated from the total nitrogen content determined by dry combustion of the polymeric dispersant and from the amine content determined through potentiometric titration in a mixture of $CH_3COOH$:THF (14.5:0.5) with 0.1N aqueous perchloric acid.

Another preferred embodiment of the present invention provides a non-aqueous inkjet ink set comprising a stable yellow non-aqueous inkjet ink.

It was found that not only C.I. Pigment Yellow 150, but also other organic colour pigments could be dispersed into stable non-aqueous inkjet inks using the same polymeric dispersant and liquid carrier. A uniform composition of the different inks in an inkjet ink set is often advantageous since no printing artefacts are to be expected due to incompatibilities between the different components of the inks.

These and other elements, features, steps, characteristics and advantages of the present invention will become more apparent from the following detailed description of preferred embodiments thereof.

DETAILED DESCRIPTION OF THE PREFERRED EMBODIMENTS

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as a colouring agent that is practically insoluble in the application medium under the pertaining ambient conditions, hence having a solubility of less than 10 mg/L therein.

The term "mixed crystal", which is synonymous for "solid solution", as used in disclosing the present invention, means a solid, homogeneous mixture of two or more constituents, which may vary in composition between certain limits and remain homogeneous.

The term "C.I." is used in disclosing the present application as an abbreviation for Colour Index.

The term "actinic radiation" as used in disclosing the present invention, means electromagnetic radiation capable of initiating photochemical reactions.

The term "spectral separation factor" as used in disclosing the present invention means the value obtained by calculating the ratio of the maximum absorbance $A_{max}$ (measured at wavelength $\lambda_{max}$) over the reference absorbance $A_{ref}$ determined at a higher wavelength $\lambda_{ref}$.

The abbreviation "SSF" is used in disclosing the present invention for spectral separation factor.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

Non-Aqueous Inkjet Inks

The non-aqueous inkjet ink according to the present invention contains at least three components: (i) a colour pigment, (ii) a polymeric dispersant and (iii) a dispersion medium.

The non-aqueous inkjet ink according to the present invention may further contain at least one surfactant.

The non-aqueous inkjet ink according to the present invention is preferably an inkjet ink selected from the group consisting of organic solvent based, oil based and curable pigmented inkjet inks. The curable pigmented inkjet ink is preferably radiation curable. The viscosity of pigmented inkjet inks is preferably smaller than 100 mPa·s at 30° C. The viscosity of the pigmented inkjet ink is preferably lower than 30 mPa·s, more preferably lower than 15 mPa·s, and most preferably between 3 and 10 mPas all measured at a shear rate of 100 s$^{-1}$ and a jetting temperature between 10 and 70° C.

The non-aqueous pigmented inkjet ink according to the present invention may contain at least one humectant to prevent the clogging of the nozzle, due to its ability to slow down the evaporation rate of ink.

The curable pigment dispersion may contain as dispersion medium monomers, oligomers and/or prepolymers possessing different degrees of functionality. A mixture including combinations of mono-, di-, tri- and/or higher functionality monomers, oligomers or prepolymers may be used. A catalyst called an initiator for initiating the polymerization reaction may be included in the curable pigmented inkjet ink. The initiator can be a thermal initiator, but is preferably a photo-initiator. The photo-initiator requires less energy to activate than the monomers, oligomers and/or prepolymers to form the polymer. The photo-initiator suitable for use in the curable pigment dispersion may be a Norrish type I initiator, a Norrish type II initiator or a photo-acid generator.

Polymeric Dispersants

The polymeric dispersant according to the present invention comprises a polyalkyleneimine core grafted by a number of polyester chain groups according to Formula (I):

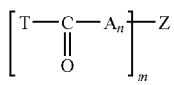 Formula (I)

wherein,

T represents hydrogen or a polymerization terminating group;

Z represents the residue of polyethyleneimine having a number-average molecular weight of at least 100;

A represents an oxyalkylene carbonyl group;

T-C(O)$A_n$- represents a TPOAC-chain which is bound to Z through an amide bond; and n and m are integers wherein m is at least 2 and n is from 2 to 100;

characterized in that the polymeric dispersant fulfills the conditions of:

$$W_{TPOAC} > 57 \text{ and } N_{Amide} \geq 65 \text{ mol \%}$$

with $W_{TPOAC}$ representing the ratio of the weight percentage of TPOAC-chains over the weight percentage of amide bonds in the polymeric dispersant;

$N_{Amide}$ representing the mol % of amide bonds based on the total nitrogen content of the polymeric dispersant; and wherein the values $W_{TPOAC}$ and $N_{Amide}$ are calculated from the total nitrogen content determined by dry combustion of the polymeric dispersant and from the amine content determined through potentiometric titration in a mixture of $CH_3COOH$:THF (14.5:0.5) with 0.1N aqueous perchloric acid.

The polymerization terminating group or endgroup T may be derived from a mono-carboxylic acid T-COOH selected from the group consisting of an aliphatic acid, an aromatic acid, a hetero-aromatic acid, a heterocyclic acid and an alicyclic acid. In a preferred embodiment, the aliphatic acid is a $C_{1-25}$ aliphatic carboxylic acid optionally substituted by hydroxyl, $C_{1-4}$ alkyl or halogen.

Examples of T-COOH are 2-ethylbutyric, 2-ethylhexanoic, 2-butyloctanoic, 2-hexyldecanoic, 2-octyldodecanoic and 2-decyltetradecanoic acids. Branched aliphatic acids of this type are available under the trade mark Isocarb (ex Condea GmbH) and specific examples are Isocarb 12, 16, 20, 28, 32, 34T and 36. T-COOH may be a single carboxylic acid or may be a mixture of such acids.

The compound formed by the (co) polymerisation of a hydroxycarboxylic acid or lactone thereof in the presence of T-COOH can be represented by the formula:

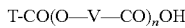

wherein V represents $C_{1-30}$-alkylene and/or $C_{1-30}$-alkenylene and is referred to hereinafter as a TPOAC-acid.

Examples of hydroxycarboxylic acids are glycolic acid, lactic acid, hydroxyvaleric acid, hydroxycaproic acid, ricinoleic acid, 12-hydroxystearic acid, 12-hydroxydodecanoic acid, 5-hydroxydodecanoic acid, 5-hydroxydecanoic acid and 4-hydroxydecanoic acid.

Examples of suitable lactones are β-propiolactone, γ-butyrolactone, optionally alkyl substituted ε-caprolactone and optionally alkyl substituted δ-valerolactone. The alkyl substituent in ε-caprolactone and δ-valerolactone is preferably $C_{1-6}$-alkyl and especially $C_{1-4}$-alkyl and may be linear or branched. The alkyl substituted ε-caprolactone may be obtained by the oxidation of alkyl substituted cyclohexanone as described in WO 98/19784 and some are obtained as mixtures. Examples of alkyl substituted ε-caprolactone are 7-methyl, 3-methyl, 5-methyl, 6-methyl, 4-methyl, 5-tert-butyl, 4,6,6-trimethyl and 4,4,6-trimethyl ε-caprolactone. An example of alkyl substituted δ-valerolactone is β-methyl-δ-valerolactone. Preferred lactones are ε-caprolactone and δ-valerolactone.

In a preferred embodiment, the TPOAC-acid comprises a mixture of oxyalkylene carbonyl groups derivable from δ-valerolactone and ε-caprolactone, more preferably this mixture comprises more than 75 mol % ε-caprolactone.

The polymeric dispersants can be obtained by reacting PEI with a TPOAC-acid or lactone precursor(s) thereof at a temperature between 50 and 250° C., preferably in an inert atmosphere and optionally in the presence of an amidation catalyst. Preferably, the temperature is not less than 80° C. and especially not less than 100° C. In order to minimize charring of the dispersant the temperature is preferably not greater than 150° C.

The inert atmosphere may be any gas which does not react with the final product or starting materials and includes the inert gases of the Periodic Table and especially nitrogen.

When the dispersant is prepared in a single stage by reacting PEI, polymerisation terminating agent T-COOH and lactone(s) it is preferable to include an esterification catalyst such as tetra-alkyl titanate, for example tetrabutyl titanate, zinc salt of an organic acid, for example, zinc acetate, zirconium salt of an aliphatic alcohol, for example zirconium isopropoxide, toluene sulphonic acid or a strong organic acid such as haloacetic acid, for example trifluoroacetic acid. Zirconium isopropoxide is preferred. When the dispersant of the first aspect of the invention is prepared by a single stage process, higher temperature may be required and these are typically from 150-180° C.

However, a two-stage process is preferred wherein the TPOAC-acid is prepared separately, prior to reacting it with PEI. In this case, the lactone(s) and polymerisation terminating agent are reacted together in an inert atmosphere at 150-180° C. in the presence of an esterification catalyst. The subsequent reaction of the TPOAC-acid with PEI may then be carried out at temperatures of 100-150° C.

An example of the synthesis of the polymeric dispersant having a polyethylenimine core grafted by polyester chains can be represented by the following condensation reaction of polyethyleneimine with a TPOAC-acid in the presence of a Zr(IV+)isopropoxide catalyst. For the sake of simplicity, polyethylene imine is represented as a linear polymer chain In the reaction schemes below, although the polyethyleneimine in accordance with the present invention is hyperbranched and contains a mixture of primary, secondary and tertiary amines.

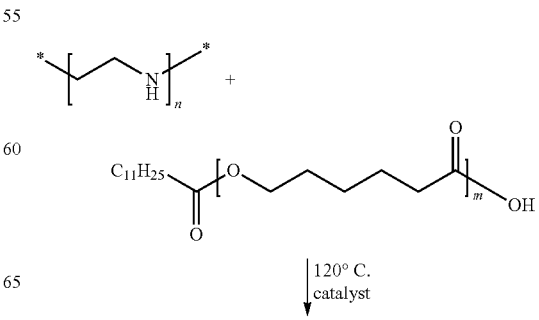

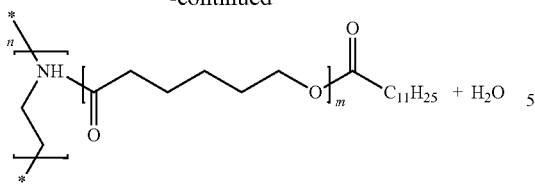

Although the reaction seems fairly simple, the synthesis is not that straightforward due to the occurrence of side reactions.

A first side reaction which occurs is the PEI (base) catalyzed hydrolyzis of the ester bond in the TPOAC-acid by water:

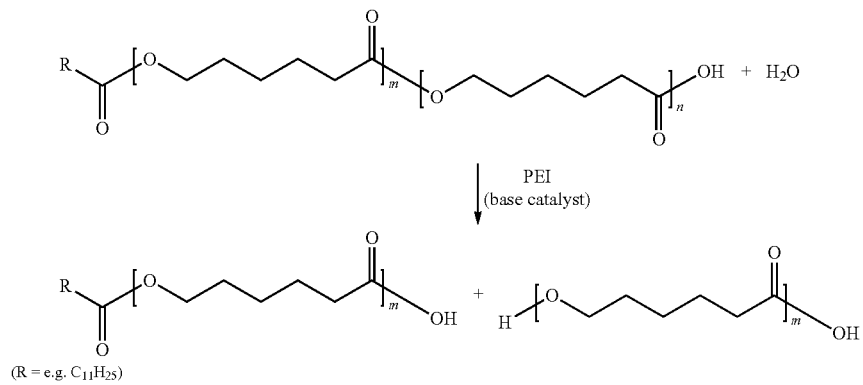

(R = e.g. $C_{11}H_{25}$)

As a result a TPOAC-acid and an alcohol terminated POAC-acid having a shorter polyester chain length than the original TPOAC-acid are formed, which can both react with the PEI to form a polymeric dispersant. The reaction may also occur after the TPOAC-acid has already reacted with the PEI, again resulting in a shorter chain length for the polyester graft, as shown below:

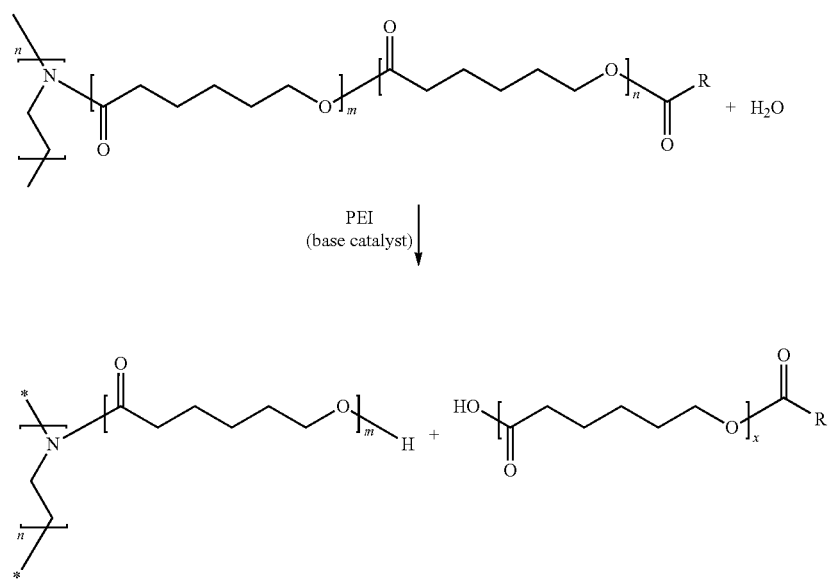

A second side reaction is a transamidation reaction of the polyester chains, again leading to shorter chain lengths of the polyester grafts on the PEI. The side reaction can occur with free TPOAC chains or with already condensed TPOAC.

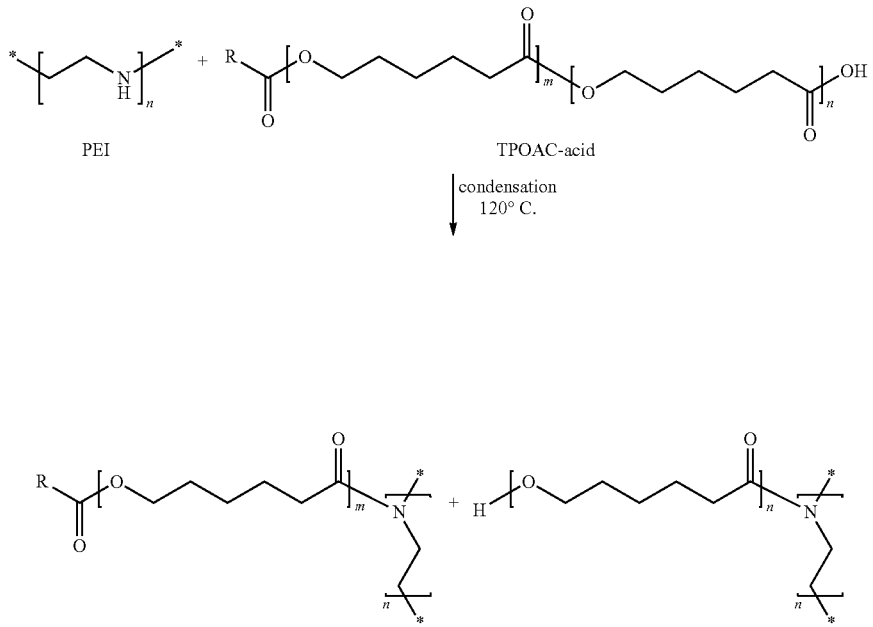

The resulting polymeric dispersant has a hyperbranched polymer architecture having a broad distribution of polyester chain lengths, which makes the polymer characterization very difficult. An optimized schematic representation of part of a polymeric dispersant wherein T-COOH was lauric acid is given by the following formula:

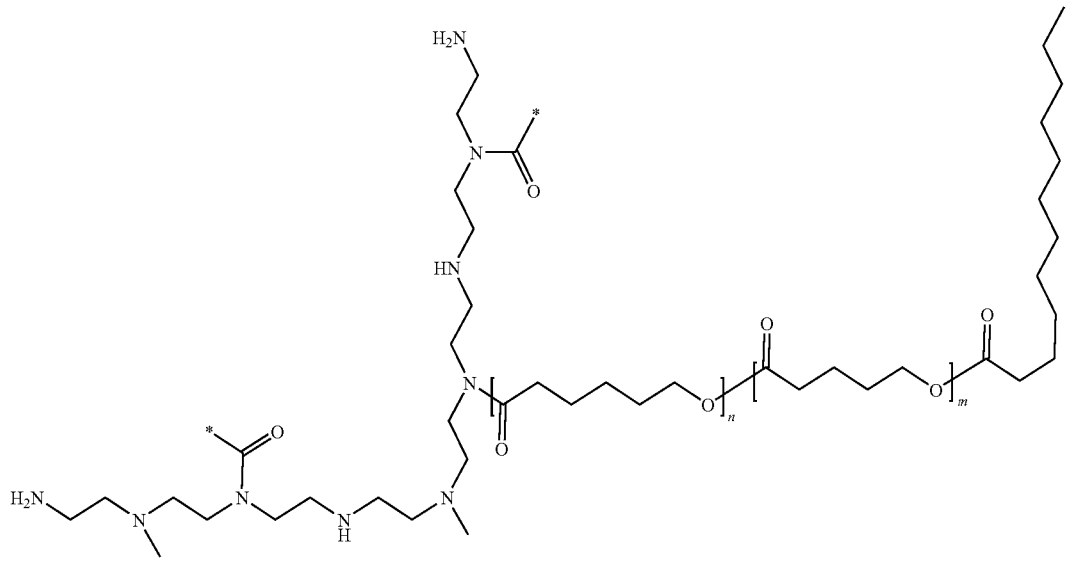

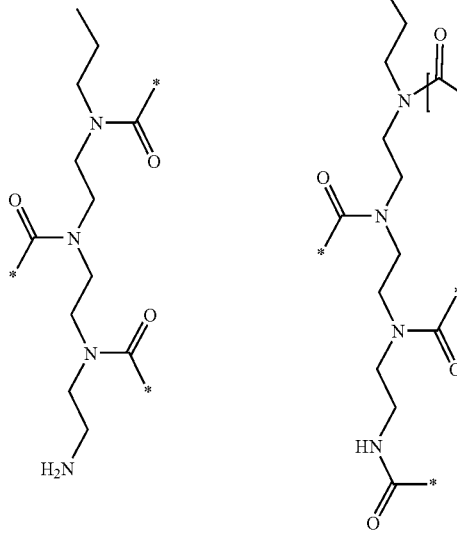
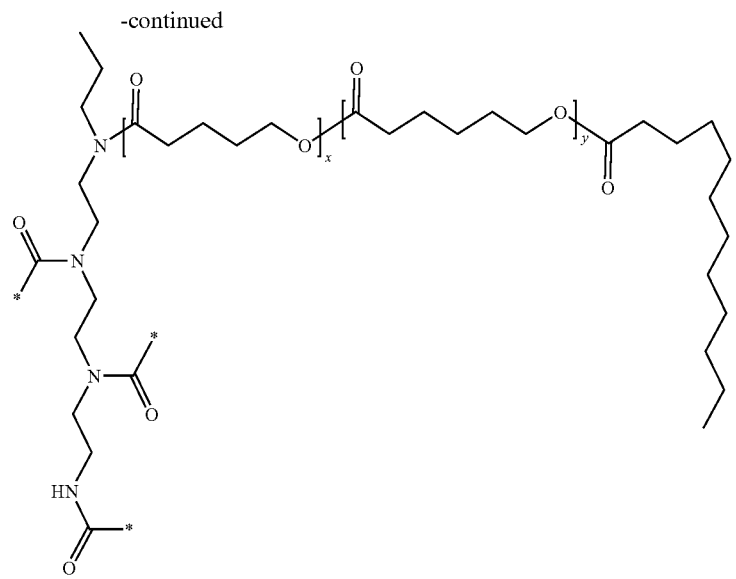

There exist many parameters for designing polymeric dispersants comprising a polyalkyleneimine core grafted by polyester chains (TPOAC-chains). These parameters include the type of N-containing core (different types of polyalkyleneimine, polyallylamine, polyvinylamine, ... ), the size of the N-containing core, the number of polyester chains, the length of the polyester chains, the endgroups of the polyester chains, the composition of the polyester chains, etc In spite of the synthetic problems and the many parameters for designing the polymeric dispersants, it was surprisingly found that there are only three crucial parameters:
1. The type of the polyalkyleneimine should be polyethyleneimine (PEI);
2. The polyester chains should be long enough; and
3. The number of polyester chains should be high enough relative to the size of the PEI.

Parameter 2 (polyester chain length) and parameter 3 (number of polyester chains) could be adequately characterized by $W_{TPOAC}$ respectively $N_{Amide}$. $W_{TPOAC}$ represents the ratio of the weight percentage of TPOAC-chains over the weight percentage of amide bonds in the polymeric dispersant.

$N_{Amide}$ represents the mol % of amide bonds based on the total nitrogen content of the polymeric dispersant.

The values of $W_{TPOAC}$ and $N_{Amide}$ can be determined by two simple analysis methods. The amine content $N_{amine}$ of the polymeric dispersant, expressed as mole amine/100 g of polymeric dispersant, can be determined through potentiometric titration in a mixture of $CH_3COOH$:THF (14.5:0.5) with 0.1N aqueous perchloric acid.

The nitrogen content $W_{tot\,N}$ of the polymeric dispersant, expressed in grams nitrogen/100 g polymeric dispersant, can be determined by dry combustion according to DIN ISO13878 (Bodenbeschaffenheit, Bestimmung des Gesamt-Stickstoffs durch trockene Verbrennung).

Calculation of $N_{Amide}$:
The mole % nitrogen present as an amide bond $N_{Amide}$ based upon the total nitrogen content $W_{tot\,N}$ of the polymeric dispersant is found by the following formula:

$$N_{Amide}=100\times[(W_{tot\,N}/14)-N_{amine}]/[W_{tot\,N}/14]$$

Note: 14=the weight of nitrogen in g/mol.

Calculation of $W_{TPOAC}$:
The weight percentage of PEI present in the polymeric dispersant is found by the formula $(W_{tot\,N}\times 43)/14$, wherein 43 represents the molecular weight of ethyleneimine in g/mol. The weight percentage of all TPOAC-chains present in the polymeric dispersant is then found by the formula $100-(W_{tot\,N}\times 43)/14$. The weight percentage of amide bonds in the polymeric dispersant is obtained by $W_{tot\,N}-(N_{amine}\times 14)$.

Hence, $W_{TPOAC}=[100\times(W_{tot\,N}\times 43)/14]/[W_{tot\,N}-(N_{amine}\times 14)]$ The polymeric dispersant according to the present invention must have:

$$W_{TPOAC}>57 \text{ and } N_{Amide}\geq 65 \text{ mol \%}.$$

Colour Pigments

The colour pigment in the non-aqueous inkjet ink according to present invention is C.I. Pigment Yellow 150.

Pigment particles in inkjet ink should be sufficiently small to permit free flow of the ink through the inkjet-printing device, especially at the ejecting nozzles. It is also desirable to use small particles for maximum colour strength and to slow down sedimentation.

The average particle size of the pigment in an inkjet ink should be between 0.005 and 15 μm. The numeric average pigment particle size is preferably between 0.005 and 5 μm, more preferably between 0.005 and 1 μm, particularly preferably between 0.005 and 0.3 μm and most preferably between 0.040 and 0.150 μm.

The pigment is preferably used in the non-aqueous inkjet ink in an amount of 0.1 to 15 wt %, preferably 1 to 10 wt % based on the total weight of the inkjet ink.

The non-aqueous inkjet ink comprising the pigment C.I. Pigment Yellow 150 is generally used in combination with inkjet inks of different colours to form an inkjet ink set. These other inkjet inks may be black, cyan, magenta, yellow, red, orange, violet, blue, green, brown, mixtures thereof, and the like.

In a preferred embodiment the inkjet ink set comprises at least a cyan ink, a magenta ink, a yellow ink and a black ink. The CMYK ink set may also be extended with extra inks such as red, green, blue, and/or orange to enlarge the colour gamut of the ink set. The CMYK ink set may also be extended by the combination of full density and light density inks of both color inks and/or black inks to improve the image quality by lowered graininess.

The pigment is preferably used in the non-aqueous pigment inkjet ink in an amount of 0.1 to 20 wt %, preferably 1 to 10 wt % based on the total weight of the non-aqueous inkjet ink. In multi-density inkjet ink sets, a light density inkjet ink preferably comprises the pigment in an amount between 0.1 to 3 wt % and a full density inkjet ink preferably comprises the pigment in an amount between 1 to 10 wt % of pigment.

The colour pigment for the other inkjet inks may be chosen from those disclosed by HERBST, Willy, et al. Industrial Organic Pigments, Production, Properties, Applications. 3rd edition. Wiley-VCH, 2004. ISBN 3527305769.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 270, 272 and 282.

Particular preferred pigments are C.I. Pigment Violet 1, 2, 19, 23, 32, 37 and 39.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. A commercially available example is Cinquasia Magenta RT-355-D from Ciba Specialty Chemicals. Mixed crystals are also referred to as solid solutions. Under certain conditions different colorants mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

Carbon black is preferred as a pigment for the non-aqueous black inkjet ink. Suitable black pigment materials include carbon blacks such as Pigment Black 7 (e.g. Carbon Black MA8™ from MITSUBISHI CHEMICAL), REGAL™ 400R, MOGUL™ L, ELFTEX™ 320 from CABOT Co., or Carbon Black FW18, Special Black 250, Special Black 350, Special Black 550, PRINTEX™ 25, PRINTEX™ 35, PRINTEX™ 55, PRINTEX™ 90, PRINTEX™ 150T from DEGUSSA. Additional examples of suitable pigments are disclosed in U.S. Pat. No. 5,389,133 (XEROX).

A neutral black inkjet ink can be obtained, for example, by mixing carbon black with a cyan, a magenta or a cyan and magenta pigment into the ink, as for example described in pending European patent application EP 1593718 A (AGFA).

It is also possible to make mixtures of pigments in a non-aqueous inkjet ink. For example, carbon black generally exhibits a warm brownish black tone, while a neutral black tone is generally preferred. A neutral black inkjet ink can be obtained, for example, by mixing carbon black with a cyan, a magenta or a cyan and magenta pigment into the ink, as for example described in pending European patent application EP 1593718 A (AGFA). The inkjet application may also require one or more spot colours, for example for packaging inkjet printing or textile inkjet printing. Silver and gold are often desired colours for inkjet poster printing and point-of-sales displays. Particular preferred pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black.

Dispersion Synergists

The non-aqueous inkjet ink according to the present invention may contain at least one dispersion synergist. A mixture of dispersion synergists may be used to further improve dispersion stability.

The dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in an amount between 0.1 and 20 wt % based upon the weight of the pigment.

The synergist should be additional to the amount of polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 1000:1, preferably between 2:1 and 100:1.

Suitable dispersion synergists that are commercially available include SOLSPERSE™ 5000 and SOLSPERSE™ 22000 from NOVEON.

In dispersing C.I. Pigment Blue 15, the use of a sulfonated Cu-phthalocyanine dispersion synergist, e.g. SOLSPERSE™ 5000 from NOVEON is preferred.

Suitable dispersion synergists for non-aqueous inkjet inks in an inkjet ink set according to the present invention include those disclosed in pending European Patent Applications EP 05111357 A (AGFA) and EP 05111360 A (AGFA).

Dispersion Media

The dispersion medium used is preferably a liquid at room temperature.

In one embodiment the dispersion medium consists of organic solvent(s). Suitable organic solvents include alcohols, ketones, esters, ethers, glycols and polyglycols and derivatives thereof, lactones, N-containing solvents such as amides, saturated hydrocarbons and unsaturated hydrocarbons. Preferably mixtures of one or more of these solvents are used.

Examples of suitable alcohols include methyl alcohol, ethyl alcohol, n-propyl alcohol, isopropyl alcohol, n-butyl alcohol, heptyl alcohol, octyl alcohol, cyclohexyl alcohol, benzyl alcohol, phenylethyl alcohol, phenylpropyl alcohol, furfuryl alcohol, anise alcohol and fluoroalcohols.

Examples of suitable ketones include acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone and isophorone, 2,4-pentanedione and hexafluoroacetone.

Examples of suitable esters include methyl acetate, ethyl acetate, n-propyl acetate, isopropyl acetate, n-butyl acetate, isobutyl acetate, hexyl acetate, octyl acetate, benzyl acetate, phenoxyethyl acetate, ethyl phenyl acetate, methyl lactate, ethyl lactate, propyl lactate, butyl lactate; methyl propionate, ethyl propionate, benzyl propionate, ethylene carbonate, propylene carbonate, amyl acetate, ethyl benzoate, butyl benzoate, butyl laurate, isopropyl myristate, isopropyl palmirate, triethyl phosphate, tributyl phosphate, diethyl phthalate, dibutyl phthalate, diethyl malonate, dipropyl malonate, diethyl succinate, dibutyl succinate, diethyl glutarate, diethyl adipate, dibutyl adipate and diethyl sebacate.

Examples of suitable ethers include butyl phenyl ether, benzyl ethyl ether, hexyl ether, diethyl ether, dipropyl ether, tetrahydrofuran and dioxane.

Examples of suitable glycols and polyglycols include ethylene glycol, diethylene glycol, triethylene glycol, propylene glycol, dipropylene glycol and tripropylene glycol.

Examples of suitable glycol and polyglycol derivatives include ethers such as alkylene glycol mono alkyl ethers, alkylene glycol dialkyl ethers, polyalkylene glycol mono alkyl ethers, polyalkylene glycol dialkyl ethers and esters of the preceding glycol ethers such as acetate and propionate esters, in case of dialkyl ethers only one ether function (resulting in mixed ether/ester) or both ether functions can be esterized (resulting in dialkyl ester).

Examples of suitable alkylene glycol mono alkyl ethers include ethylene glycol mono methyl ether, ethylene glycol mono ethyl ether, ethylene glycol mono propyl ether, ethylene glycol mono butyl ether, ethylene glycol mono hexyl ether, ethylene glycol mono 2-ethyl-hexyl ether, ethylene glycol mono phenyl ether, propylene glycol mono methyl ether, propylene glycol mono ethyl ether, propylene glycol mono n-propyl ether, propylene glycol mono n-butyl ether, propylene glycol mono iso-butyl ether, propylene glycol mono t-butyl ether and propylene glycol mono phenyl ether.

Examples of suitable alkylene glycol dialkyl ethers include ethylene glycol dimethyl ether, ethylene glycol diethyl ether, ethylene glycol methyl ethyl ether, ethylene glycol dibutyl ether, propylene glycol dimethyl ether, propylene glycol diethyl ether and propylene glycol dibutyl ether.

Examples of suitable polyalkylene glycol mono alkyl ethers include diethylene glycol mono methyl ether, diethylene glycol mono ethyl ether, diethylene glycol mono-n-propyl ether, diethylene glycol mono n-butyl ether, diethylene glycol mono hexyl ether, triethylene glycol mono methyl ether, triethylene mono ethyl ether, triethylene glycol mono butyl ether, dipropylene mono methyl ether, dipropylene glycol mono ethyl ether, dipropylene glycol n-propyl ether, dipropylene glycol mono n-butyl ether, dipropylene mono t-butyl ether, tripropylene glycol mono methyl ether, tripropylene glycol mono ethyl ether, tripropylene glycol mono n-propyl ether and tripropylene glycol mono n-butyl ether.

Examples of suitable polyalkylene glycol dialkyl ethers include diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methyl ethyl ether, triethylene glycol methyl ethyl ether, tetraethylene glycol methyl ethyl ether, diethylene glycol di-n-propyl ether, diethylene glycol di-iso-propyl ether, dipropylene glycol dimethyl ether, dipropylene glycol diethyl ether, dipropylene di n-propyl ether, dipropylene di t-butyl ether, tripropylene glycol dimethyl ether and tripropylene glycol diethyl ether.

Examples of suitable glycol esters include ethylene glycol monomethyl ether acetate, ethylene glycol monoethyl ether acetate, ethylene glycol monopropyl ether acetate, ethylene glycol monobutyl ether acetate, diethylene glycol monoethyl ether acetate, diethylene glycol monobutyl ether acetate, propylene glycol monomethyl ether acetate, propylene glycol monoethyl ether acetate, dipropylene glycol monomethyl ether acetate and propylene glycol monomethyl ether propionate.

Preferred solvents for use in the pigment dispersion and inkjet inks according to the present invention are one or more polyalkyleneglycol dialkylethers represented by the formula (PAG)

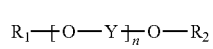

Formula (PAG)

wherein,
$R_1$ and $R_2$ are each independently selected from an alkyl group having 1 to 4 carbon atoms;
Y represents an ethylene group and/or a propylene group;
wherein
n is an integer selected from 4 to 20 for a first polyalkyleneglycol dialkylether; and n is an integer selected from 5 to 20 for a second polyalkyleneglycol.

The alkyl groups $R_1$ and $R_2$ of the polyalkyleneglycol dialkylethers according to Formula (PAG) preferably represent methyl and/or ethyl. Most preferably the alkyl groups $R_1$ and $R_2$ are both methyl groups.

In a preferred embodiment the polyalkyleneglycol dialkylethers according to Formula (PAG) are polyethylene glycol dialkylethers.

In another preferred embodiment, a mixture of 2, 3, 4 or more polyalkyleneglycol dialkylethers, more preferably polyethylene glycol dialkylethers are present in the pigment dispersion or inkjet ink.

Suitable mixtures of polyalkyleneglycol dialkylethers for the pigment dispersions include mixtures of polyethylene glycol dimethyl ethers having a molecular weight of at least 200, such as Polyglycol DME 200™, Polyglycol DME 250™ and Polyglycol DME 500™ from CLARIANT. The polyalkyleneglycol dialkylethers used in non-aqueous inkjet inks have preferably an average molecular weight between 200 and 800, and more preferably no polyalkyleneglycol dialkylethers with a molecular weight of more than 800 are present. The mixture of polyalkyleneglycol dialkylethers is preferably a homogeneous liquid mixture at room temperature.

Suitable commercial glycol ether solvents include CELLOSOLVE™ solvents and CARBITOL™ solvents from UNION CARBIDE, EKTASOLVE™ solvents from EASTMAN, DOWANOL™ solvents from DOW, OXITOLL™ solvents, DIOXITOLL™ solvents, PROXITOLL™ solvents and DIPROXITOLL™ solvents from SHELL CHEMICAL and ARCOSOLV™ solvents from LYONDELL.

Lactones are compounds having a ring structure formed by ester bonds and can be of the γ-lactone (5-membered ring structure), δ-lactone (6-membered ring structure) or ε-lactone (7-membered ring structure) types. Suitable examples of lactones include γ-butyrolactone, γ-valerolactone, γ-hexylactone, γ-heptalactone, γ-octalactone, γ-nonalactone, γ-decalactone, γ-undecalactone, δ-valerolactone, δ-hexylactone, δ-heptalactone, δ-octalactone, δ-nonalactone, δ-decalactone, δ-undecalactone and ε-caprolactone.

Suitable examples of N-containing organic solvents include 2-pyrrolidone, N-methylpyrrolidone, N,N-dimethylacetamid, N,N-dimethylformamid, acetonitril and N,N-dimethyldodecanamide.

Examples of suitable hydrocarbons include saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,1,3,5,7-cyclooctatetraene; and cyclododecene; and aromatic hydrocarbons such as benzene, toluene and xylene.

In another embodiment the dispersion medium comprises oil types of liquids, alone or in combination with organic solvent(s).

Suitable organic solvents include alcohols, ketones, esters, ethers, glycols and polyglycols and derivatives thereof, lactones, N-containing solvents such as amides, higher fatty acid ester and mixtures of one or more of the solvents as described above for solvent based dispersion media.

The amount of polar solvent is preferably lower than the amount of oil. The organic solvent has preferably a high boiling point, preferably above 200° C. Examples of suitable combinations are disclosed by EP 0808347 (XAAR TECHNOLOGY LTD) especially for the use of oleyl alcohol and EP 1157070 (VIDEOJET TECHNOLOGIES INC) for the combination of oil and volatile organic solvent.

Suitable oils include saturated hydrocarbons and unsaturated hydrocarbons, aromatic oils, paraffinic oils, extracted paraffinic oils, napthenic oils, extracted napthenic oils, hydro treated light or heavy oils, vegetable oils, white oils, petroleum naphtha oils, halogen-substituted hydrocarbons, silicones and derivatives and mixtures thereof.

Hydrocarbons may be selected from straight chain or branched chain aliphatic hydrocarbons, alicyclic hydrocarbons and aromatic hydrocarbons. Examples of hydrocarbons are saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,1,3,5,7-cyclooctatetraene; and cyclododecene; and aromatic hydrocarbons such as benzene, toluene, xylene, naphthalene, phenanthrene, anthracene and derivatives thereof. In literature the term paraffinic oil is often used. Suitable Paraffinic oils can be normal paraffin type (octane and higher alkanes), isoparaffins (isooctane and higher iso-alkanes) and cycloparaffins (cyclooctane and higher cycloalkanes) and mixtures of paraffin oils. The term "liquid paraffin" is often used to refer to a mixture of mainly comprising three components of a normal paraffin, an isoparaffin and a monocyclic paraffin, which is obtained by highly refining a relatively volatile lubricating oil fraction through a sulphuric-acid washing or the like, as described in U.S. Pat. No. 6,730,153 (SAKATA INX CORP.). Suitable hydrocarbons are also described as de-aromatized petroleum distillates.

Suitable examples of halogenated hydrocarbons include methylene dichloride, chloroform, carbon tetra chloromethane and methyl chloroform. Other suitable examples of halogen-substituted hydrocarbons include perfluoro-alkanes, fluorine-based inert liquids and fluorocarbon iodides.

Suitable examples of silicone oils include dialkyl polysiloxane (e.g., hexamethyl disiloxane, tetramethyl disiloxane, octamethyl trisiloxane, hexamethyl trisiloxane, heptamethyl trisiloxane, decamethyl tetrasiloxane, trifluoropropyl heptamethyl trisiloxane, diethyl tetramethyl disiloxane), cyclic dialkyl polysiloxane (e.g., hexamethyl cyclotrisiloxane, octamethyl cyclotetrasiloxane, tetramethyl cyclotetrasiloxane, tetra(trifluoropropyl)tetramethyl cyclotetrasiloxane), and methylphenyl silicone oil.

White oils is a term used for white mineral oils, which are highly refined mineral oils that consist of saturated aliphatic and alicyclic non-polar hydrocarbons. White oils are hydrophobic, colourless, tasteless, odourless, and do not change colour over time.

Vegetable oils include semi-drying oils such as soybean oil, cotton seed oil, sunflower oil, rape seed oil, mustard oil, sesame oil and corn oil; non-drying oils such as olive oil, peanut oil and tsubaki oil; and drying oils such as linseed oil and safflower oil, wherein these vegetable oils can be used alone or as a mixture thereof.

Examples of other suitable oils include petroleum oils, non-drying oils and semi-drying oils.

Commercially available suitable oils include the aliphatic hydrocarbons types such as the ISOPAR™ range (isoparaffins) and Varsol/Naphtha range from EXXON CHEMICAL, the SOLTROL™ range and hydrocarbons from CHEVRON PHILLIPS CHEMICAL, and the SHELLSOL™ range from SHELL CHEMICALS.

Suitable commercial normal paraffins include the NORPAR™ range from EXXON MOBIL CHEMICAL.

Suitable commercial napthenic hydrocarbons include the NAPPAR™ range from EXXON MOBIL CHEMICAL.

Suitable commercial de-aromatized petroleum distillates include the EXXSOL™ D types from EXXON MOBIL CHEMICAL.

Suitable commercial fluoro-substituted hydrocarbons include fluorocarbons from DAIKIN INDUSTRIES LTD, Chemical Division.

Suitable commercial silicone oils include the silicone fluid ranges from SHIN-ETSU CHEMICAL, Silicone Division.

Suitable commercial white oils include WITCO™ white oils from CROMPTON CORPORATION.

If the non-aqueous pigment dispersion is a curable pigment dispersion, the dispersion medium comprises one or more monomers and/or oligomers to obtain a liquid dispersion medium. Sometimes, it can be advantageous to add a small amount of an organic solvent to improve the dissolution of the dispersant. The content of organic solvent should be lower than 20 wt % based on the total weight of the pigment inkjet ink. In other cases, it can be advantageous to add a small amount of water, for example, to improve the spreading of the inkjet ink on a hydrophilic surface, but preferably the ink-jet ink contains no water.

Preferred organic solvents include alcohols, aromatic hydrocarbons, ketones, esters, aliphatic hydrocarbons, higher fatty acids, carbitols, cello solves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Suitable monomers and oligomers can be found in Polymer Handbook, Vol. 1+2. 4th edition. Edited by J. BRANDRUP, et al. Wiley-Interscience, 1999.

Any polymerizable compound commonly known in the art may be employed. Particularly preferred for use as a radiation curable compound in the radiation curable inkjet ink are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaeryhtitol tetraacrylate, methoxylated glycol acrylates and acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, b-methylstyrene, p-methyl-b-methylstyrene, a-methylstyrene and p-methoxy-b-methylstyrene.

Suitable examples of vinylnaphthalene compounds are 1-vinylnaphthalene, a-methyl-1-vinylnaphthalene, b-methyl-1-vinylnaphthalene, 4-methyl-1-vinylnaphthalene and 4-methoxy-1-vinylnaphthalene.

Suitable examples of N-vinyl heterocyclic compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

The cationically polymerizable compound of the inkjet ink can be one or more monomers, one or more oligomers or a combination thereof.

Suitable examples of cationically curable compounds can be found in Advances in Polymer Science, 62, pages 1 to 47 (1984) by J. V. Crivello.

The cationic curable compound may contain at least one olefin, thioether, acetal, thioxane, thietane, aziridine, N, O, S or P heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

The cationically polymerizable monomer can be mono-, di- or multi-functional or a mixture thereof.

Suitable cationic curable compounds having at least one epoxy group are listed in the "Handbook of Epoxy Resins" by Lee and Neville, McGraw Hill Book Company, New York (1967) and in "Epoxy Resin Technology" by P. F. Bruins, John Wiley and Sons New York (1968).

Examples of cationic curable compounds having at least one epoxy group include 1,4-butanediol diglycidyl ether, 3-(bis(gycidyloxymethyl)methoxy)-1,2-propane diol, limonene oxide, 2-biphenyl gycidyl ether, 3,4-epoxycyclohexylmethyl-3',4'-epoxycyclohexane carboxylate, epichlorohydrin-bisphenol S based epoxides, epoxidized styrenics and more epichlorohydrin-bisphenol F and A based epoxides and epoxidized novolaks.

Suitable epoxy compounds comprising at least two epoxy groups in the molecule are alicyclic polyepoxide, polyglycidyl ester of polybasic acid, polyglycidyl ether of polyol, polyglycidyl ether of polyoxyalkylene glycol, polyglycidyl ester of aromatic polyol, polyglycidyl ether of aromatic polyol, urethane polyepoxy compound, and polyepoxy polybutadiene.

Examples of cycloaliphatic diepoxides include copolymers of epoxides and hydroxyl components such as glycols, polyols, or vinyl ether, such as 3,4-epoxycyclohexylmethyl-3',4'-epoxycyclohexylcarboxylate; bis(3,4-epoxycylohexyl-methyl) adipate; limonene diepoxide; diglycidyl ester of hexahydrophthalic acid.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, a-methylphenyl vinyl ether, b-methylisobutyl vinyl ether and b-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexylmethyl benzoate, bis[4-(vinyloxy)butyl]isophthalate, bis[4-(vinyloxymethyl)cyclohexylmethyl]glutarate, tris[4-(vinyloxy)butyl]trimellitate, 4-(vinyloxy)butyl steatite, bis [4-(vinyloxy)butyl]hexanediylbiscarbamate, bis[4-(vinyloxy)methyl]cyclohexyl]methyl]terephthalate, bis[4-(vinyloxy)methyl]cyclohexyl]methyl]isophthalate, bis[4-

(vinyloxy)butyl](4-methyl-1,3-phenylene)-biscarbamate, bis[4-vinyloxy)butyl](methylenedi-4,1-phenylene)biscarbamate and 3-amino-1-propanol vinyl ether.

Suitable examples of oxetane compounds having at least one oxetane group include 3-ethyl-3-hydroloxymethyl-1-oxetane, the oligomeric mixture 1,4-bis[3-ethyl-3-oxetanyl methoxy)methyl]benzene, 3-ethyl-3-phenoxymethyl-oxetane, bis ([1-ethyl(3-oxetanil)]methyl)ether, 3-ethyl-3-[(2-ethylhexyloxy)methyl]oxetane, 3-ethyl-[(tri-ethoxysilyl propoxy)methyl]oxetane and 3,3-dimethyl-2(p-methoxyphenyl)-oxetane.

Initiators

A curable inkjet ink usually contains an initiator. The initiator typically initiates the polymerization reaction. The initiator can be a thermal initiator, but is preferably a photo-initiator. The photo-initiator requires less energy to activate than the monomers, oligomers and/or prepolymers to form the polymer. The photo-initiator suitable for use in the curable liquids may be a Norrish type I initiator, a Norrish type II initiator or a photo-acid generator.

Thermal initiator(s) suitable for use in the curable inkjet ink include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 1,1-Bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

The photo-initiator or photo-initiator system absorbs light and is responsible for the production of initiating species, such as free radicals and cations. Free radicals and cations are high-energy species that induce polymerization of monomers, oligomers and polymers and with polyfunctional monomers and oligomers thereby also induce cross-linking.

Irradiation with actinic radiation may be realized in two steps by changing wavelength or intensity. In such cases it is preferred to use 2 types of photo-initiator together.

A combination of different types of initiator, for example, a photo-initiator and a thermal initiator can also be used.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-halophenylglyoxalates.

A preferred Norrish type II-initiator is selected from the group consisting of benzophenones, thioxanthones, 1,2-diketones and anthraquinones. A preferred co-initiator is selected from the group consisting of an aliphatic amine, an aromatic amine and a thiol. Tertiary amines, heterocyclic thiols and 4-dialkylamino-benzoic acid are particularly preferred as co-initiator.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluorophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, Lucerin TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

The curable inkjet ink may contain a photo-initiator system containing photo-initiator(s) and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable pigmented inkjet ink.

In order to increase the photosensitivity further, the curable pigmented inkjet inks may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable pigmented inkjet ink.

A preferred initiator system is 2,2'-bis(o-chlorophenyl)-4,4',5,5'-tetraphenyl-(7CI, 8CI) 4,4'-Bi-4H-imidazole corresponding to the chemical formula:

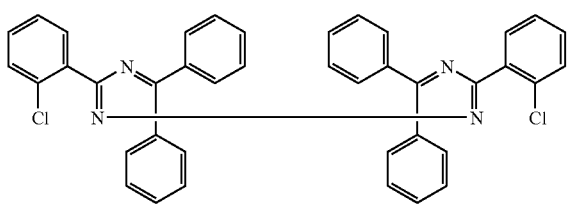

in the presence of a co-initiator such as 2-mercapto benzoxazole.

Another preferred type of initiator is an oxime ester. A suitable example has as chemical formula:

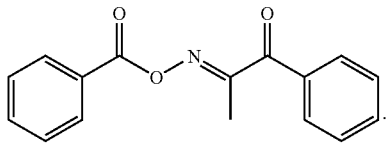

A preferred amount of initiator is 0.3-50 wt % of the total weight of the curable pigmented inkjet ink, and more preferably 1-15 wt % of the total weight of the curable pigmented inkjet ink.

Inhibitors

Radiation curable inkjet inks according to the present invention may contain a polymerization inhibitor. Suitable polymerization inhibitors include phenol type antioxidants, hindered amine light stabilizers, phosphor type antioxidants, hydroquinone monomethyl ether commonly used in (meth) acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn A G; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd. ADDITOL™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total ink.

Surfactants

The pigmented inkjet ink according to the present invention may contain at least one surfactant. The surfactant(s) can be anionic, cationic, non-ionic, or zwitter-ionic and are usually added in a total quantity less than 20 wt % based on the total weight of the pigmented inkjet ink and particularly in a total less than 10 wt % based on the total weight of the pigmented inkjet ink.

Suitable surfactants for the pigmented inkjet ink according to the present invention include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons), silicones and siloxanes. The silicones may be polyether modified, polyether modified hydroxy functional, amine modified, epoxy modified and other modifications or combinations thereof. The siloxanes may be alkoxylated. Preferred silicones and siloxanes are polymeric, for example polydimethylsilicones and polydimethylsiloxanes.

When the pigmented inkjet ink is a radiation curable inkjet ink a fluorinated or silicone compound may be used as a surfactant, preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth) acrylates or mixtures thereof.

Other Additives

In addition to the constituents, described above, the pigmented inkjet inks may, if necessary, further contain following additives to have desired performance: UV-absorbers, evaporation accelerators, rust inhibitors, crosslinking agents, soluble electrolytes as conductivity aid, sequestering agents and chelating agents, compounds to introduce security features, . . . .

Compounds to introduce security features include a fluorescent compound, a phosphorescent compound, a thermochromic compound, an iridescent compound and a magnetic particle. Suitable UV-fluorescent and phosphorescent compounds include LUMILUX™ luminescent pigments from HONEYWELL, UVITEX™ OB from CIBA-GEIGY, KEYFLUOR™ dyes and pigments from KEYSTONE and fluorescent dyes from SYNTHEGEN.

Preparation of Inkjet Inks

The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy. A combination of these techniques may be used.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and for radiation curable inkjet inks as much as possible under light conditions in which actinic radiation has been substantially excluded.

The inkjet ink according to the present invention may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigment ink from the equipment. By dilution, the inkjet ink is adjusted to the desired viscosity, surface tension, colour, hue, saturation density, and print area coverage for the particular application.

Inkjet Printers

The non-aqueous inkjet ink according to the present invention may be jetted by one or more printing heads ejecting small droplets of liquid in a controlled manner through nozzles onto an ink-receiver surface, which is moving relative to the printing head(s).

A preferred printing head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head. However the inkjet printing method is not restricted to piezoelectric inkjet printing. Other inkjet printing heads can be used and include various types, such as a continuous type and thermal, electrostatic and acoustic drop on demand type.

At high printing speeds, the inks must be ejected readily from the printing heads, which puts a number of constraints on the physical properties of the ink, e.g. a low viscosity at the jetting temperature, which may vary from 25° C. to 110° C., a surface energy such that the printing head nozzle can form the necessary small droplets, a homogeneous liquid capable of rapid conversion to a dry printed area, . . . .

The viscosity of the inkjet ink used in the ink-jet printing method according to the present invention is preferably lower than 30 mPa·s, more preferably lower than 15 mPa·s, and most preferably between 2 and 10 mPas at a shear rate of 100 s$^{-1}$ and a jetting temperature between 10 and 70° C.

The inkjet printing head normally scans back and forth in a transversal direction across the moving ink-receiver surface. Often the inkjet print head does not print on the way back. Bi-directional printing is preferred for obtaining a high areal throughput. Another preferred print mode is printing in a "single pass printing process", which can be performed by using page wide inkjet printing heads or multiple staggered inkjet printing heads which cover the entire width of the ink-receiver surface. In a single pass printing process the inkjet printing heads usually remain stationary and the ink-receiver surface is transported under the inkjet printing heads.

Spectral Separation Factor

The spectral separation factor SSF was found to be an excellent measure to characterize a pigmented inkjet ink, as it takes into account properties related to light-absorption (e.g. wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of e.g. a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $A_{max}$ over the absorbance $A_{ref}$ at a reference wavelength.

$$SSF = \frac{A_{max}}{A_{ref}}$$

The SSF is an excellent tool to design inkjet ink sets with large colour gamut. Often inkjet ink sets are now commercialized, wherein the different inks are not sufficiently matched with each other. For example, the combined absorption of all inks does not give a complete absorption over the whole visible spectrum, e.g. "gaps" exist between the absorption spectra of the colorants. Another problem is that one ink might be absorbing in the range of another ink. The resulting colour gamut of these inkjet ink sets is low or mediocre.

EXAMPLES

The present invention will now be described in detail by way of Examples hereinafter.

Materials

All materials used in the following examples were readily available from standard sources such as ALDRICH CHEMICAL Co. (Belgium) and ACROS (Belgium) unless otherwise specified.

PV19 is HOSTAPERM™ Red E5B02, a C.I. Pigment Violet 19 from CLARIANT.
PV19/PR202 is CHROMOPHTAL™ Jet Magenta 3BC2, a mixed crystal of C.I. Pigment Violet 19 and C.I. Pigment Red 202 from CIBA SPECIALTY CHEMICALS.
PB15:4 is HOSTAPERM™ Blue P-BFS, a C.I. Pigment Blue 15:4 from CLARIANT.
PY4 is ACETANIL™ 10 GO 0415C, a C.I. Pigment Yellow 4 from CAPPELLE PIGMENTS N.V.
PY12 is PERMANENT™ Yellow DHG M250, a C.I. Pigment Yellow 12 from CLARIANT.
PY14 is SUNBRITE™ Yellow 14, a C.I. Pigment Yellow 14 from SUN CHEMICAL.
PY74 is HANSA™ Brilliant Yellow 5GX 03, a C.I. Pigment Yellow 74 from CLARIANT.
PY81 is NOVOPERM™ Yellow H10G 01, a C.I. Pigment Yellow 81 from CLARIANT.
PY83 is NOVOPERM™ Yellow P-HR 07 VP2436, a C.I. Pigment Yellow 83 from CLARIANT.
PY93 is HEUBACH™ Gelb 109300, a C.I. Pigment Yellow 93 from HEUBACH GmbH.
PY95 is CHROMOPHTAL™ Yellow GR, a C.I. Pigment Yellow 95 from CIBA SPECIALTY CHEMICALS.
PY97 is NOVOPERM™ Yellow FGL, a C.I. Pigment Yellow 97 from CLARIANT.
PY110 is CHROMOPHTAL™ Yellow 3RT, a C.I. Pigment Yellow 110 from CIBA SPECIALTY CHEMICALS.

PY111 is HANSA™ Brilliant Yellow 7GX, a C.I. Pigment Yellow 111 from CLARIANT.
PY120 is NOVOPERM™ Yellow H2G, a C.I. Pigment Yellow 120 from CLARIANT.
PY128 is CHROMOPHTAL™ Jet Yellow 8GF, a C.I. Pigment Yellow 128 from CIBA SPECIALTY CHEMICALS.
PY155 is NOVOPERM™ Yellow 4G, a C.I. Pigment Yellow 155 from CLARIANT.
PY170 is LYSOPAC™ Geel 7010C, a C.I. Pigment Yellow 170 from CAPPELLE PIGMENTS N.V.
PY176 is PERMANENT™ Yellow GRX 83, a C.I. Pigment Yellow 176 from CLARIANT.
PY180 is TONER™ Yellow HG, a C.I. Pigment Yellow 180 from CLARIANT.
PY213 is INK JET™ Yellow H5G LP 3083, a C.I. Pigment Yellow 213 from CLARIANT.
PBL7 is SPECIAL BLACK™ 550, a carbon black available from DEGUSSA.
PR202 is the abbreviation for C.I. Pigment Red 202 for which CINQUASIA MAG RT235D from CIBA SPECIALTY CHEMICALS was used.
Diethyl-5-(hydroxymethyl)isophthalate from ALDRICH.
DPGDA is dipropyleneglycoldiacrylate available under the trade name of SARTOMER™ SR508 from SARTOMER.
SR9003 is an abbreviation for SARTOMER™ SR9003, a propoxylated neopentyl glycol diacrylate monomer available from SARTOMER.
Vinylcaprolactam is
CRAYNOR™ CN 386 is an amine modified acrylate synergist available from CRAY VALLEY.
GENOCURE™ EPD is ethyl 4-dimethylaminobenzoate available from RAHN AG.
ITX is 4-phenylbenzophenone, a photo-initiator available under the trade name of GENOCURE™ ITX from CIBA SPECIALTY CHEMICALS.
TPO is 2,4,6-trimethylbenzoyl-diphenyl-phosphineoxide available under the trade name DAROCUR™ TPO from CIBA SPECIALTY CHEMICALS.
BYK™ UV3510 is a polyethermodified polydimethylsiloxane wetting agent available from BYK CHEMIE GMBH.
BykSol is a 50% solution of BYK™ UV3510 in DPGDA.
ITX is a photo-initiator available under the trade name of DAROCUR™ ITX from CIBA SPECIALTY CHEMICALS.
GENORAD™ 16 is polymerization inhibitor from RAHN AG.
GenoSol is a 50% solution of GENORAD™ 16 in DPGDA.
GENOCURE™ PBZ is 4-phenylbenzophenone, a photo-initiator from RAHN AG.
SARTOMER™ 399 LV is a low viscosity dipentaerythritol pentaacrylate from SARTOMER.
SOLSPERSE™ 35100 is a 40% polyethyleneimine core grafted with polyester hyperdispersant solution in butyl acetate available from NOVEON.
S32000 is SOLSPERSE™ 32000, S33000 is SOLSPERSE™ 33000 and
S39000 is SOLSPERSE™ 39000, and these are all three solid polyethyleneimine cores grafted with polyester hyperdispersant from NOVEON.
DEGDEE is diethylene glycol diethylether from ACROS.

The quinacridone derivative QAD-3 is represented by the formula:

QAD-3

Synthesis of the dispersion synergist QAD-3 was accomplished according to the following synthesis scheme:

38.1 g

PR202

QA-2

QAD-3

(0.1 mol) of dried pigment PR202 in 130 gram dimethylsulfoxide was dissolved by the addition of 23 g (0.205 mol) potassium tert-butoxide. The blue-green solution was heated to about 110° C. for 1 hour. Then the mixture was cooled till 40° C., and 25.5 g (0.105 mol) of compound QA-2 was added. The alkylation-step was done after 4 hours. The product was hydrolyzed by the addition of 400 ml of water and 19.5 gram Potassium hydroxide 86% (0.3 mol) after 4 hours heating at 60° C. Then 75 ml concentrated hydrochloric acid (0.9 mol) was added to the mixture. The dispersion synergist QAD-3 was filtered and washed with water. The yield was 100%.

Synthesis of dimethyl-(5-chloromethyl)isophthalate (QA-2) was accomplished according to the following synthesis scheme

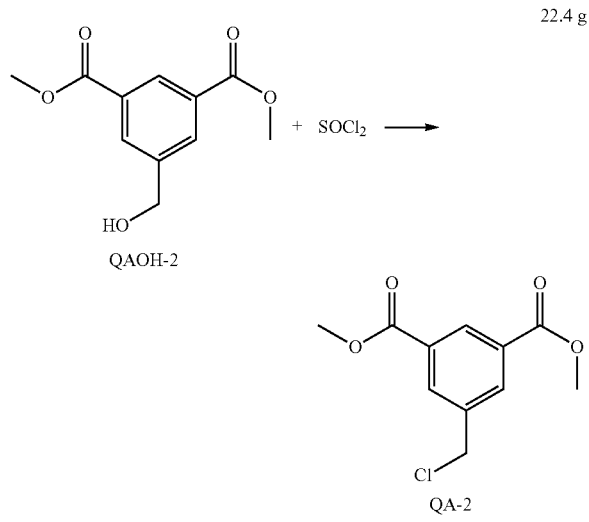

(0.1 mol) of dimethyl-(5-hydroxymethyl)isophthalate (QAOH-2) was dissolved in a mixture of 100 mL of Toluene and 0.2 g dimethylacetamide (catalyst). 15.4 g (0.13 mol) of thionylchloride was added drop wise and the mixture was stirred during 4 hour at 40° C. After this period, the mixture was cooled in an ice bath and 50 mL of methanol was added. This solid product QA-2 was filtered and washed with a small volume of methanol. The yield was 58%.

Synthesis of dimethyl-(5-hydroxymethyl)isophthalate QOAH-2 was accomplished according to the following synthesis scheme

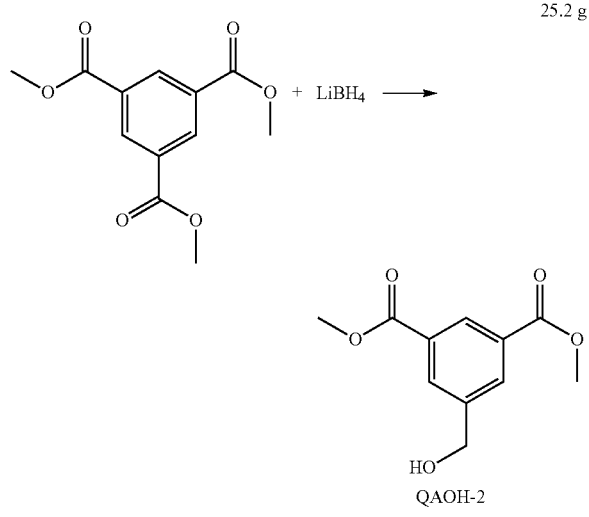

(0.1 mol) of trimethyl 1,3,5 benzenetricarboxylate was dissolved in 85 mL of methyl acetate at 50° C. 40.5 ml (0.08 mol) lithiumborohydride 2.0 M in THF was added drop wise and the mixture was stirred during 3 hour at 50° C. After this period 5.3 gram acetic acid (0.088 mol) and 3 mL water were added. The methyl acetate and THF were evaporated, 50 ml water and 50 ml n-hexane were added. The product QAOH-2 was filtered and washed with a small volume water and n-hexane. The yield was 63%.

Measurement Methods

1. Measurement of SSF

The spectral separation factor SSF of an ink was calculated by using the data of the recorded spectrum of an ink solution and comparing the maximum absorbance to the absorbance at a reference wavelength. The choice of this reference wavelength is dependent on the pigment(s) used:

if the colour ink has a maximum absorbance $A_{max}$ between and 500 nm then the absorbance $A_{ref}$ must be determined at a reference wavelength of 600 nm, If the colour ink has a maximum absorbance $A_{max}$ between and 600 nm then the absorbance $A_{ref}$ must be determined at a reference wavelength of 650 nm, If the colour ink has a maximum absorbance $A_{max}$ between and 700 nm then the absorbance $A_{ref}$ must be determined at a reference wavelength of 830 nm.

The absorbance was determined in transmission with a Shimadzu UV-2101 PC double beam-spectrophotometer. The inkjet inks were diluted with ethyl acetate to have a pigment concentration according to Table 1.

TABLE 1

| Inkjet ink with maximum absorbance $A_{max}$ | Pigment concentration |
| --- | --- |
| between 400 and 500 | 0.002% |
| between 500 and 600 | 0.005% |
| between 600 and 700 | 0.002% |

A spectrophotometric measurement of the UV-VIS-NIR absorption spectrum of the diluted ink was performed in transmission-mode with a double beam-spectrophotometer using the settings of Table 2. Quartz cells with a path length of 10 mm were used and ethyl acetate was chosen as a blank.

TABLE 2

| Mode | Absorbance |
| --- | --- |
| Wavelength range | 240-900 nm |
| Slit width | 2.0 nm |
| Scan interval | 1.0 nm |
| Scan speed | Fast (1165 nm/min) |
| Detector | photo-multiplier (UV-VIS) |

Efficient pigment inkjet inks exhibiting a narrow absorption spectrum and a high maximum absorbance have a value for SSF of at least 30.

2. Average Particle Size (BI90)

The average particle size diameter was determined with a Brookhaven Instruments Particle Sizer BI90plus based upon the principle of dynamic light scattering. The ink or dispersion was diluted with ethyl acetate to a pigment concentration of 0.002 wt %. The measurement settings of the BI90plus were: 5 runs at 23° C., angle of 90°, wavelength of 635 nm and graphics=correction function.

3. Average Particle Size (Malvern)

The particle size of pigment particles in pigment inkjet ink was determined by photon correlation spectroscopy at a wavelength of 633 nm with a 4 mW HeNe laser on a diluted sample of the pigment inkjet ink. The particle size analyzer used was a MALVERN™ nano-S available from Goffin-Meyvis.

The sample was prepared by addition of one drop of ink to a cuvet containing 1.5 mL ethyl acetate and mixed until a homogenous sample was obtained. The measured particle size is the average value of 3 consecutive measurements consisting of 6 runs of 20 seconds. For good ink jet characteristics (jetting characteristics and print quality) the average particle size of the dispersed particles is below 200 nm, preferably about 100 nm. The pigment inkjet ink is considered to be a stable pigment dispersion if the particle size remained below 200 nm after a heat treatment of 7 days at 80° C.

4. Viscosity

The viscosity of the inkjet inks was measured using a Brookfield DV-II+ viscometer at 25° C. and shear rate of 15 RPM.

5. Pigment Dispersion Stability

The dispersion stability was evaluated by comparing the SSF before and after a heat treatment of one week at 80° C. The decrease of SSF of pigmented inkjet inks exhibiting good dispersion stability should preferably be less than 15%.

6. $W_{tot\,N}$

The nitrogen content of a polymer was determined according to DIN ISO13878 (Bodenbeschaffenheit, Bestimmung des Gesamt-Stickstoffs durch trockene Verbrennung).

7. $N_{Amide}$

The amine content $N_{amine}$ of the polymeric dispersant, expressed as mol amine/100 g of polymeric dispersant, can be determined through potentiometric titration in a mixture of $CH_3COOH{:}THF$ (14.5:0.5) with 0.1N aqueous perchloric acid. The mole % nitrogen present as an amide bond $N_{Amide}$ based upon the total nitrogen content $W_{tot\,N}$ of the polymeric dispersant is found by the following formula:

$$N_{Amide}=100\times[(W_{tot\,N}/14)-N_{amine}]/[W_{tot\,N}/14]$$

8. $W_{TPOAC}$

The $W_{TPOAC}$ is calculated by the formula:

$$W_{TPOAC}=[100-(N_{tot}\times43)/14]/[N_{tot}-(N_{amine}\times14)].$$

Example 1

This example illustrates the preparation of polymeric dispersants by condensation of carboxylic acid terminated polyester and PEI.

Synthesis of the TPOAC-acid PE1

The TPOAC-acid PE1 ($LA_1$-$\epsilon Cap_{18.7}$-co-$\delta Val_{4.3}$) was prepared according to the following procedure: a mixture of 66.0 g Lauric acid (0.15 mol, Acros Organics), 714.3 g epsilon Caprolactone (1.800 mol, Acros Organics) and 148.4 g delta Valerolactone (0.90 mol, Acros Organics) is heated to 100° C. and degassed with $N_2$ during 30 min. 3.45 g Zirconium IV isopropoxide isopropanol complex (3.5 mmol, Aldrich) is added and the mixture is heated to 170° C. After 6 hours stirring at 170° C. the mixture is cooled.

Synthesis of the TPOAC-acid PE2

The TPOAC-acid PE2 ($LA_1$-$\epsilon Cap_{21.3}$-co-$\delta Val_{4.1}$) was prepared according to the following procedure: a mixture of 85.0 g Lauric acid (0.15 mol, Acros Organics), 1041.0 g epsilon Caprolactone (1.800 mol, Acros Organics) and 233.6 g delta Valerolactone (0.90 mol, Acros Organics) is heated to 100° C. and degassed with $N_2$ during 30 min. 4.44 g Zirconium IV isopropoxide isopropanol complex (3.5 mmol, Aldrich) is added and the mixture is heated to 170° C. After 6 hours stirring at 170° C. the mixture is cooled.

Synthesis of Polymeric Dispersant (PD1).

Polymeric dispersant PD1 was prepared according to the following procedure: a mixture of 1130.0 g TPOAC-acid PE1 and 87.0 g polyethyleneimine (PEI) Epomin SP200 (Nippon Shokubai, molecular weight 10000 g/mol on the label) is heated to 120° C. It is stirred for 6 hours under a constant $N_2$ flow. After 6 hours stirring at 120° C. the mixture is cooled.

The polymeric dispersants PD2 to PD4 were prepared according to the same procedure, but using amounts (in g) as indicated in Table 3.

TABLE 3

| Polymeric dispersant | TPOAC-acid | wt ratio graft/PEI | $m_{PEI}$ (g) | $m_{PE}$ graft (g) |
|---|---|---|---|---|
| PD1 | PE1 | 13/1 | 87.0 | 1130.0 |
| PD2 | PE2 | 16.5/1 | 25.0 | 412.5 |
| PD3 | PE2 | 13/1 | 30.0 | 390.0 |
| PD4 | PE2 | 6/1 | 65.0 | 390.0 |

Polymeric Dispersant S35000

SOLSPERSE™ 35100 is a hyperdispersant used in highly concentrated paints. This hyperdispersant was only available as a 40 wt % solution in butyl acetate.

This polymeric dispersant S35000 was obtained by a specific request to the manufacturer, NOVEON, to deliver a batch of the same polymeric dispersant SOLSPERSE™ 35100 but without addition of butyl acetate or other solvents.

Characterization of the Polymeric Dispersants

For each polymeric dispersant, the values were determined for $N_{Amine}$ and $N_{Amine}$.he and subsequently the $W_{TPOAC}$ and $N_{Amide}$ were calculated. The results are given by Table 4.

TABLE 4

| Polymeric dispersant | $W_{tot\,N}$ (wt % N) | $N_{Amine}$ (mole amine/100 g polymer) | $W_{TPOAC}$ | $N_{Amide}$ (mol % relative to total N-content) |
|---|---|---|---|---|
| PD1 | 2.3 | 0.0624 | 65 | 62 |
| PD2 | 1.9 | 0.0446 | 74 | 67 |
| PD3 | 2.4 | 0.0575 | 58 | 66 |
| PD4 | 4.6 | 0.1320 | 31 | 60 |
| S32000 | 2.5 | 0.0588 | 55 | 67 |
| S39000 | 2.4 | 0.0521 | 55 | 70 |
| S35000 | 2.0 | 0.0504 | 73 | 65 |

Example 2

This example illustrates that a range different organic solvents can be used to dilute a concentrated pigment dispersion of PY150.

Preparation of the Concentrated Pigment Dispersion

Two concentrated pigment dispersions were prepared in the same manner to obtain a composition as described in Table 5, except that in a first dispersion the polymeric dispersant S39000 was used, while in the second concentrated dispersion the polymeric dispersant S35000 was used.

TABLE 5

| Component | wt % |
| --- | --- |
| PY150 | 15 |
| Polymeric Dispersant | 15 |
| DEGDEE | 70 |

The concentrated pigment dispersion was made by mixing the 75.0 g of pigment and 187.5 g of a 40% solution of the polymeric dispersant in the organic solvent diethyleneglycol diethylether (DEGDEE) for 30 minutes using a DISPERLUX™ YELLOW075 (from DISPERLUX S.A.R.L., Luxembourg) and subsequently milling this mixture in a NETZSCH Mini-Zeta (from NETZSCH-CONDUX Mahltechnik GmbH) using yttrium-stabilized zirconium oxide-beads of 0.4 mm diameter ("high wear resistant zirconia grinding media" from TOSOH Co.). The bead mill is filled with 900 g of the grinding beads and water-cooled during milling at 2886 rpm for 45 minutes. After milling the dispersion was separated from the beads using a filter cloth.

The average particle size (BI90), SSF and viscosity was determined. The two concentrated pigment dispersions prepared with the polymeric dispersants S39000 and S35000 exhibited similar physical properties as can be seen in Table 6.

TABLE 6

| Physical property | S39000 Pigment dispersion | S35000 Pigment dispersion |
| --- | --- | --- |
| Viscosity (mPa · s) | 31 | 32 |
| SSF | 56 | 57 |
| Particle size (nm) | 142 | 145 |

Inkjet inks were then prepared by diluting 4 g of the pigment dispersions with 11 g of organic solvent S1 to S20 of Table 7.

TABLE 7

| Solvent | Organic solvents |
| --- | --- |
| S1 | Mesitylene (1,3,5-trimethylbenzene) |
| S2 | Chlorobenzene |
| S3 | n-amyl acetate |
| S4 | n-butylacetate |
| S5 | n-butylglycolacetate (BGA) |
| S6 | Toluene |
| S7 | Carbotilacetate (DEGMEEA) |
| S8 | DOWANOL ™ DPMA (DPGMMEA) |
| S9 | Dimethylphthalate |
| S10 | Diethylene glycol dibutyl ether (DEGDBE) |
| S11 | Tetraethyleneglycol dimethylether (TeEGDME) |
| S12 | Methyl acetate |
| S13 | Methylal |
| S14 | 4-Heptanone |
| S15 | Chlorobenzene/Amylacetate (50/50) |
| S16 | Toluene/Amylacetate (50/50) |
| S17 | Chlorobenzene/DEGDEE (50/50) |
| S18 | Toluene/Chlorobenzene (50/50) |
| S19 | DEGDEE/Cycloheptanone (50/50) |
| S20 | Cycloheptanone/Amylacetate (60/40) |

Evaluation of the Inkjet Inks

The dispersion quality was evaluated after dilution of the concentrated pigment dispersions to inkjet inks by measuring the SSF and expressing the result as a percentage loss in SSF after dilution from the pigment dispersion. The ink sample was then given a heat treatment for 7 days at 83° C. before the SSF was measured again. The percentage loss in SSF after heat treatment with reference to the SSF of the inkjet ink is given in the second column "7d/83° C." of Table 8.

TABLE 8

| Inkjet ink diluted with solvent: | Ink with S39000 % Loss in SSF after | | Ink with S35000 % Loss in SSF after | |
| --- | --- | --- | --- | --- |
| | dilution | 7 d/83° C. | dilution | 7 d/83° C. |
| S1 | 0 | 81 | 2 | 0 |
| S2 | 0 | 0 | 0 | 0 |
| S3 | 0 | 65 | 1 | 3 |
| S4 | 0 | 56 | 1 | 0 |
| S5 | 0 | 52 | 0 | 0 |
| S6 | 0 | 31 | 0 | 0 |
| S7 | 0 | 5 | 1 | 0 |
| S8 | 0 | 28 | 1 | 0 |
| S9 | 0 | 0 | 37 | 0 |
| S10 | 33 | 89 | 48 | 84 |
| S11 | 0 | 14 | 0 | 0 |
| S12 | 0 | 4 | 0 | 0 |
| S13 | 0 | 33 | 1 | 9 |
| S14 | 0 | 66 | 2 | 8 |
| S15 | 0 | 29 | 0 | 0 |
| S16 | 0 | 58 | 0 | 0 |
| S17 | 0 | 16 | 0 | 0 |
| S18 | 0 | 3 | 40 | 0 |
| S19 | 0 | 6 | 1 | 0 |
| S20 | 0 | 0 | 0 | 0 |

From Table 8, it can be seen that the concentrated pigment dispersions of PY150 using the polymeric dispersant S35000 can be diluted by a lot more solvents for making inkjet inks without serious deterioration of dispersion quality or stability.

Example 3

This example illustrates the effects of the design of the polymeric dispersant on the quality and dispersion stability of inkjet inks comprising PV19.

Preparation of Inkjet Inks

All inkjet inks were prepared in the same manner as described in Example 2 except that the pigment PY150 was replaced by the quinacridone pigment PV19 and that the polymeric dispersant PD1 to PD4, S32000, S35000 and S39000 were used to prepare concentrated pigment dispersions.

Evaluation of Inkjet Inks

The concentrated PV19 dispersions were diluted into inkjet inks S1 to S20 using the same organic solvents S1 to S20 of Example 2 in Table 7.

The dispersion quality of the inkjet inks was determined for each ink by calculating the Spectral Separation Factor SSF. The results are shown in Table 9.

TABLE 9

| Inkjet ink diluted with solvent | SSF of inkjet ink with polymeric dispersant: | | | | | | |
|---|---|---|---|---|---|---|---|
| | PD3 | PD2 | PD1 | PD4 | S32000 | S39000 | S35000 |
| S1 | 45 | 45 | 46 | 45 | 42 | 39 | 45 |
| S2 | 44 | 44 | 47 | 43 | 39 | 9 | 46 |
| S3 | 44 | 44 | 47 | 47 | 41 | 40 | 45 |
| S4 | 43 | 43 | 47 | 46 | 43 | 42 | 45 |
| S5 | 38 | 38 | 38 | 36 | 4 | 4 | 35 |
| S6 | 43 | 43 | 47 | 51 | 43 | 36 | 45 |
| S7 | 43 | 43 | 47 | 51 | 44 | 43 | 46 |
| S8 | 44 | 44 | 47 | 49 | 43 | 44 | 45 |
| S9 | 42 | 42 | 46 | 55 | 21 | 8 | 44 |
| S10 | 42 | 42 | 45 | 49 | 20 | 8 | 43 |
| S11 | 42 | 42 | 47 | 51 | 29 | 8 | 45 |
| S12 | 44 | 44 | 46 | 52 | 42 | 37 | 44 |
| S13 | 43 | 43 | 46 | 52 | 43 | 43 | 44 |
| S14 | 42 | 42 | 47 | 59 | 43 | 40 | 43 |
| S15 | 43 | 43 | 47 | 56 | 38 | 14 | 43 |
| S16 | 44 | 44 | 47 | 54 | 43 | 45 | 44 |
| S17 | 43 | 43 | 47 | 57 | 44 | 47 | 44 |
| S18 | 44 | 44 | 46 | 50 | 43 | 48 | 45 |
| S19 | 42 | 42 | 47 | 59 | 44 | 42 | 44 |
| S20 | 40 | 40 | 45 | 51 | 42 | 8 | 43 |
| # inkjet inks out of 20 | 20 | 20 | 20 | 20 | 17 | 13 | 20 |
| $W_{TPOAC}$ | 58 | 74 | 65 | 31 | 55 | 55 | 73 |
| $N_{Amide}$ | 66 | 67 | 62 | 60 | 67 | 70 | 65 |

From Table 9, it is clear that dilution with some of the solvents resulted in an inferior dispersion quality, i.e. a SSF<30, for the commercial dispersants S32000 and S39000. The row "# Inkjet inks out of 20" indicates the number of inkjet inks out of the 20 inkjet inks prepared that exhibited good dispersion quality.

The inkjet inks were then given a heat treatment of 7 days at 83° C. to evaluate their dispersion stability. The dispersion stability is expressed in % loss in SSF after heat treatment in Table 10.

TABLE 10

| Inkjet ink | % loss in SSF after 7 days at 83° C. | | | | | | |
|---|---|---|---|---|---|---|---|
| | PD3 | PD2 | PD1 | PD4 | S32000 | S39000 | S35000 |
| S1 | 8 | 8 | 30 | 23 | 12 | 56 | 0 |
| S2 | 8 | 8 | 75 | 7 | 19 | 100 | 10 |
| S3 | 5 | 5 | 5 | 2 | 14 | 21 | 2 |
| S4 | 3 | 3 | 0 | 2 | 21 | 12 | 5 |
| S5 | 1 | 1 | 85 | 0 | 100 | 100 | 0 |
| S6 | 0 | 0 | 32 | 17 | 11 | 57 | 0 |
| S7 | 8 | 8 | 3 | 27 | 28 | 7 | 6 |
| S8 | 6 | 6 | 6 | 10 | 15 | 33 | 3 |
| S9 | 25 | 25 | 75 | 52 | 100 | 100 | 9 |
| S10 | 7 | 7 | 71 | 82 | 100 | 100 | 35 |
| S11 | 13 | 13 | 72 | 73 | 15 | 100 | 13 |
| S12 | 8 | 8 | 37 | 76 | 36 | 50 | 0 |
| S13 | 6 | 6 | 21 | 68 | 24 | 36 | 0 |
| S14 | 8 | 8 | 17 | 66 | 45 | 48 | 29 |
| S15 | 7 | 7 | 69 | 100 | 10 | 100 | 0 |
| S16 | 1 | 1 | 11 | 100 | 13 | 14 | 0 |
| S17 | 2 | 2 | 41 | 100 | 30 | 36 | 18 |
| S18 | 2 | 2 | 15 | 19 | 22 | 27 | 0 |
| S19 | 18 | 18 | 11 | 72 | 51 | 58 | 34 |
| S20 | 19 | 19 | 74 | 69 | 56 | 100 | 15 |
| # Inkjet Inks out of 20 | 17 | 17 | 7 | 5 | 7 | 3 | 16 |
| $W_{TPOAC}$ | 58 | 74 | 65 | 31 | 55 | 55 | 73 |
| $N_{Amide}$ | 66 | 67 | 62 | 60 | 67 | 70 | 65 |

The row "Inkjet inks out of 20" indicates the number of inkjet inks out of the 20 inkjet inks prepared that exhibited good dispersion quality. Table 10 shows that only using the polymeric dispersant PD2, PD3 or S35000 having $W_{TPOAC}>57$ and $N_{Amide} \geq 65$ mol %, it was possible to dilute the pigment dispersion into an inkjet ink with more than 15 out of the 20 different organic solvents without unacceptable deterioration of dispersion stability.

Example 4

The polymeric dispersant can also be used to make a non-aqueous pigmented inkjet ink set. This example illustrates the preparation of a non-aqueous cyan inkjet ink containing C.I. Pigment Blue 15:4.

Preparation and Evaluation of Inkjet Inks

It was found that PB15:4 exhibited a similar behaviour as PY150, i.e. the polymeric dispersant allowed a wide variety of liquids for diluting a concentrated pigment dispersion of PB15:4 into an inkjet ink. This is exemplified here below for radiation curable inkjet inks either lacking or comprising vinylcaprolactam as monomer. Vinylcaprolactam is especially useful to include into a radiation curable inkjet ink when the printing is to be performed on a PVC substrate, because of its capability of partly dissolving the PVC surface thereby improving adhesion properties.

Two concentrated pigment dispersions of PB15:4 were prepared in the same manner to obtain a composition as described in Table 11, except that in a first dispersion 'A' the polymeric dispersant S39000 was used as a polymeric dispersant, while in the second concentrated dispersion 'B' the polymeric dispersant S35000 was used.

TABLE 11

| Component | wt % |
|---|---|
| PB15:4 | 20 |
| Polymeric Dispersant | 20 |
| GENORAD ™ 16 | 1 |
| DPGDA | 49 |

The concentrated pigment dispersion was made by mixing 140.0 g of the cyan pigment, 14.0 g of GenoSol and 466.7 g of a 30% solution of the polymeric dispersant in DPGDA for 30 minutes using a DISPERLUX™ YELLOW075 (from DISPERLUX S.A.R.L., Luxembourg) and subsequently milling this mixture in a EIGER MINI MOTOR MILL (from Eiger Machinery, Inc.) using yttrium-stabilized zirconium oxide-beads of 0.4 mm diameter ("high wear resistant zirconia grinding media" from TOSOH Co.). The bead mill is filled for 52% of the volume with the grinding beads and water-cooled during milling for 90 minutes. After milling the dispersion was separated from the beads using a filter cloth.

The concentrated pigment dispersion 'A' having S39000 as polymeric dispersant and concentrated pigment dispersion 'B' having S35000 as polymeric dispersant were diluted with the components according to Table 12 to obtain 4 inkjet inks A1, A2, B1 and B2.

TABLE 12

| Component | S39000 Ink A1 | S39000 Ink A2 | S35000 Ink B1 | S35000 Ink B2 |
|---|---|---|---|---|
| Dispersion 'A' | 15.0 | 15.0 | — | — |
| Dispersion 'B' | — | — | 15.0 | 15.0 |
| DPGDA | 68.0 | 51.0 | 68.0 | 51.0 |
| Vinylcaprolactam | — | 17.0 | — | 17.0 |
| GENOCURE ™ EPD | 5.0 | 5.0 | 5.0 | 5.0 |
| ITX | 5.0 | 5.0 | 5.0 | 5.0 |
| TPO | 5.0 | 5.0 | 5.0 | 5.0 |
| GenoSol | 1.8 | 1.8 | 1.8 | 1.8 |
| BykSol | 0.2 | 0.2 | 0.2 | 0.2 |

The dispersion quality was evaluated for the inks by measuring the viscosity at 45° C. and the average particle size (BI90) after the dilution of the concentrated pigment dispersion into an ink. The dispersion stability on the inkjet inks A1, A2, B1 and B2 was evaluated after storing the inks for 7 days at 83° C. and measuring the viscosity at 45° C. and the average particle size (BI90) again. The results are shown in Table 13.

TABLE 13

| | After dilution | | After 7 days at 83° C. | |
|---|---|---|---|---|
| Inkjet Ink | Viscosity (mPa·s) | Particle size (nm) | % increase in viscosity | % increase in particle size |
| A1 | 9.1 | 134 | 7 | 7 |
| A2 | 8.1 | 135 | 32 | 128 |
| B1 | 8.9 | 132 | 2 | 0 |
| B2 | 8.1 | 131 | 14 | 6 |

From Table 13 it can be seen that the dilution with a liquid carrier either lacking or containing vinylcaprolactam in the presence of S35000 as polymeric dispersant exhibits minor differences in dispersion stability, contrary to the inks using S39000 as polymeric dispersant.

Example 5

This example illustrates that it is possible to prepare a non-aqueous radiation curable CMYK inkjet ink set with pigments and polymeric dispersants in accordance with the present invention.

Preparation of Inkjet Inks

It was found also possible to make a stable black inkjet ink comprising carbon black as pigment and a magenta inkjet ink with a mixed crystal of C.I. Pigment Violet 19 instead of PV19 as in Example 3. A dispersion synergist QAD-3 was added to obtain an excellent dispersion quality and stability.

The radiation curable inkjet ink set was prepared according to Table 14. The concentrated pigment dispersions were made in the same manner as described for the B1 ink comprising PB15:4 of Example 4, with the exception that different pigments were used in the other concentrated pigment dispersions.

TABLE 14

| in wt % of ink | K | M | C | Y |
|---|---|---|---|---|
| DPGDA | 76.248 | 79.94 | 77.00 | 77.60 |
| PBL7 | 2.25 | — | — | — |
| PV19/PR202 | 0.81 | 4.00 | — | — |
| PB15:4 | 0.81 | — | 3.00 | — |
| PY150 | — | — | — | 2.70 |
| S35000 | 3.87 | 4.00 | 3.00 | 2.70 |
| QAD-3 | 0.012 | 0.06 | — | — |
| GENOCURE ™ EPD | 5.00 | 5.00 | 5.00 | 5.00 |
| GENOCURE ™ PBZ | 4.50 | 2.50 | 2.50 | 2.50 |
| TPO | 4.50 | 2.50 | 2.50 | 2.50 |
| SARTOMER ™ 399 LV | — | — | 5.00 | 5.00 |
| BYK ™ UV 3510 | 1.00 | 1.00 | 1.00 | 1.00 |
| GENORAD ™ 16 | 1.00 | 1.00 | 1.00 | 1.00 |

The CMYK ink set was evaluated on the single pass inkjet printer: DOTRIX™ from AGFA. The good dispersion stability of the inks was reflected in a very reliable jetting performance of this ink set with no failing printing nozzles during one week and a latency time of >100 hours.

Example 6

This example illustrates that non-aqueous inkjet inks comprising a C.I. Pigment Yellow 150 exhibits superior dispersion stability and quality compared to other type of yellow pigments.

Preparation of Inkjet Inks

All inkjet inks were prepared in the same manner as in EXAMPLE 2, except that different yellow pigments were used in combination with the same polymeric dispersant S35000. The average particle size (Malvern) and the viscosity was determined.

TABLE 15

| Pigment | Average Particle Size (nm) | Viscosity (mPa·s) |
|---|---|---|
| PY150 | 145 | 32 |
| PY4 | flocculated | |
| PY12 | flocculated | |
| PY14 | flocculated | |
| PY74 | flocculated | |
| PY81 | flocculated | |
| PY83 | flocculated | |
| PY93 | flocculated | |
| PY95 | flocculated | |
| PY97 | flocculated | |
| PY110 | flocculated | |
| PY111 | flocculated | |
| PY128 | flocculated | |
| PY155 | flocculated | |
| PY170 | flocculated | |
| PY176 | flocculated | |
| PY213 | flocculated | |

From Table 15, it was surprising to see that only PY150 could be dispersed into a non-aqueous inkjet ink using the polymeric dispersant S35000, contrary to many other pigments.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A non-aqueous inkjet ink comprising:
C.I. Pigment Yellow 150;
a dispersion medium; and
a polymeric dispersant according to Formula (I):

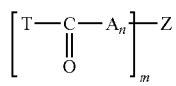

Formula (I)

wherein
T represents hydrogen or a polymerization terminating group;
Z represents the residue of hyperbranched polyethyleneimine having a number-average molecular weight of at least 100;
A represents one or more oxyalkylene carbonyl groups selected from the group consisting of oxyalkylene carbonyl groups derivable from δ-valerolactone, ε-caprolactone, and $C_{1-4}$-alkyl substituted ε-caprolactone;
T-C(O)$A_n$- represents a TPOAC-chain which is bound to Z through an amide bond; and
n and m are integers wherein m is at least 2 and n is from 2 to 100; and
the polymeric dispersant satisfies the conditions of:

$W_{TPOAC} > 57$ and $N_{Amide} \geq 65$ mol % wherein
$W_{TPOAC}$ represents a ratio of a weight percentage of the TPOAC-chains over a weight percentage of the amide bonds in the polymeric dispersant;
$N_{Amide}$ represents the mol % of the amide bonds based on a total nitrogen content of the polymeric dispersant; and
the values of $W_{TPOAC}$ and $N_{Amide}$ are calculated from the total nitrogen content determined by dry combustion of the polymeric dispersant and from the amine content determined through potentiometric titration in a mixture of $CH_3COOH$:THF (14.5:0.5) with 0.1N aqueous perchloric acid.

2. The non-aqueous inkjet ink according to claim 1, wherein a chain moiety represented by -$A_n$- is a mixture of oxyalkylene carbonyl groups derivable from δ-valerolactone and ε-caprolactone.

3. The non-aqueous inkjet ink according to claim 2, wherein the mixture contains more than 75 mol % ε-caprolactone.

4. The non-aqueous inkjet ink according to claim 2, wherein the alkyl substituent of $C_{1-4}$ alkyl substituted ε-caprolactone is methyl.

5. The non-aqueous inkjet ink according to claim 1, wherein T is derived from a mono-carboxylic acid T-COOH selected from the group consisting of an aliphatic acid, an aromatic acid, a hetero-aromatic acid, a heterocyclic acid, and an alicyclic acid.

6. The non-aqueous inkjet ink according to claim 5, wherein the aliphatic acid is a $C_{1-25}$ aliphatic carboxylic acid optionally substituted by hydroxyl, $C_{1-4}$ alkyl or halogen.

7. The non-aqueous inkjet ink according to claim 1, further comprising a radiation curable compound.

8. A non-aqueous inkjet ink set comprising:
at least one non-aqueous inkjet ink including:
C.I. Pigment Yellow 150;
a dispersion medium; and
a polymeric dispersant according to Formula (I):

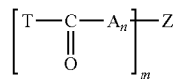

Formula (I)

wherein
T represents hydrogen or a polymerization terminating group;
Z represents the residue of hyperbranched polyethyleneimine having a number-average molecular weight of at least 100;
A represents one or more oxyalkylene carbonyl groups selected from the group consisting of oxyalkylene carbonyl groups derivable from δ-valerolactone, ε-caprolactone, and $C_{1-4}$-alkyl substituted ε-caprolactone;
T-C(O)$A_n$- represents a TPOAC-chain which is bound to Z through an amide bond; and
n and m are integers wherein m is at least 2 and n is from 2 to 100;
the polymeric dispersant satisfies the conditions of:

$W_{TPOAC} > 57$ and $N_{Amide} \geq 65$ mol % wherein
$W_{TPOAC}$ represents a ratio of a weight percentage of the TPOAC-chains over a weight percentage of the amide bonds in the polymeric dispersant;
$N_{Amide}$ represents the mol % of the amide bonds based on a total nitrogen content of the polymeric dispersant; and
the values of $W_{TPOAC}$ and $N_{Amide}$ are calculated from the total nitrogen content determined by dry combustion of the polymeric dispersant and from the amine content determined through potentiometric titration in a mixture of $CH_3COOH$:THF (14.5:0.5) with 0.1N aqueous perchloric acid.

9. The non-aqueous inkjet ink set according to claim 8, wherein the ink set includes a second non-aqueous inkjet ink comprising C.I. Pigment Violet 19 or a mixed crystal thereof.

10. The non-aqueous inkjet ink set according to claim 8, wherein the ink set includes a non-aqueous inkjet ink comprising C.I. Pigment Blue 15:4.

* * * * *